United States Patent
Tanaka et al.

(10) Patent No.: US 9,615,063 B2
(45) Date of Patent: Apr. 4, 2017

(54) METHOD AND APPARATUS FOR VISUAL MONITORING

(71) Applicant: Eye Stalks Corporation, Palo Alto, CA (US)

(72) Inventors: Greg Lin Tanaka, Palo Alto, CA (US); David Way Ng, Redwood City, CA (US); Chengpeng Chen, Fremont, CA (US); Dave Tahmoush, Adelphi, MD (US); Derek Ma, Palo Alto, CA (US)

(73) Assignee: Eye Stalks Corporation, Palo Alto, CA (US)

( * ) Notice: Subject to any disclaimer, the term of this patent is extended or adjusted under 35 U.S.C. 154(b) by 945 days.

(21) Appl. No.: 13/727,605

(22) Filed: Dec. 27, 2012

(65) Prior Publication Data
US 2013/0208112 A1 Aug. 15, 2013

Related U.S. Application Data

(60) Provisional application No. 61/580,629, filed on Dec. 27, 2011.

(51) Int. Cl.
*H04N 7/18* (2006.01)
*G08B 13/196* (2006.01)
(Continued)

(52) U.S. Cl.
CPC ......... *H04N 7/18* (2013.01); *G08B 13/19621* (2013.01); *H04N 5/2252* (2013.01);
(Continued)

(58) Field of Classification Search
CPC ........... H04N 21/21805; H04N 5/2252; H04N 5/2253; H04N 21/41407; G06K 2207/1012
See application file for complete search history.

(56) References Cited

U.S. PATENT DOCUMENTS 5,111,391 A 5/1992 Fields et al.
6,027,277 A 2/2000 Leyden et al.
(Continued)

FOREIGN PATENT DOCUMENTS

JP 2005 333201 A 12/2005
WO WO 00/74018 A1 12/2000

OTHER PUBLICATIONS

PCT International Search Report, International Application No. PCT/US 12/71689, filed Dec. 7, 2012.
(Continued)

*Primary Examiner* — Hung Dang
*Assistant Examiner* — Sunghyoun Park

(57) ABSTRACT

A device for visual monitoring comprises a mobile chipset disposed in a housing, at least one eyestalk attached to the housing and communicatively coupled to the mobile chipset, and mounting hardware affixed to the housing, the mounting hardware configured to secure the housing to a stationary structure. In one embodiment, the mobile chipset is configured to execute a set of program instructions in response to the device being connected to external power, including program instructions which, when executed by the mobile chipset, causes the device to take pictures in response to automatically generated triggers, and to automatically upload image data to a packet-based network for display and/or further processing. In a further embodiment, the device is configured to pre-process the image data, such as extracting relevant data for a specific application, before uploading the image data to the packet-based network for further process. In another embodiment, the device is configured to automatically upload image data to a social network site for sharing among authorized users of the cite.

20 Claims, 23 Drawing Sheets

(51) Int. Cl.
*H04N 5/225* (2006.01)
*H04N 5/232* (2006.01)
*H04N 5/235* (2006.01)

(52) U.S. Cl.
CPC ....... *H04N 5/2355* (2013.01); *H04N 5/23206* (2013.01); *H04N 5/23232* (2013.01); *H04N 7/185* (2013.01); *H04N 7/188* (2013.01); *G08B 13/19632* (2013.01); *G08B 13/19695* (2013.01)

(56) References Cited

U.S. PATENT DOCUMENTS

| | | | |
|---|---|---|---|
| 6,587,831 | B1 | 7/2003 | O'Brien |
| 6,742,002 | B2 | 5/2004 | Arrowood |
| 6,963,826 | B2 | 11/2005 | Hanaman et al. |
| 6,983,101 | B1* | 1/2006 | Sugimura ............... H04N 5/77 375/E7.089 |
| 7,222,082 | B1 | 5/2007 | Adhikari et al. |
| 7,945,465 | B2 | 5/2011 | Theiler |
| 8,401,884 | B1 | 3/2013 | Kinney |
| 8,666,795 | B2 | 3/2014 | Cameron et al. |
| 8,699,370 | B2 | 4/2014 | Leung et al. |
| 8,725,567 | B2 | 5/2014 | Huang et al. |
| 8,926,869 | B2 | 1/2015 | Shanun |
| 8,989,775 | B2 | 3/2015 | Shaw |
| 2003/0011706 | A1 | 1/2003 | Chang et al. |
| 2003/0052970 | A1* | 3/2003 | Dodds ................... G08B 1/08 348/148 |
| 2003/0182162 | A1* | 9/2003 | Stevens ................ G06Q 50/22 705/2 |
| 2003/0197807 | A1* | 10/2003 | Wu ................ G08B 13/19619 348/375 |
| 2003/0214583 | A1 | 11/2003 | Sadok |
| 2004/0101162 | A1* | 5/2004 | Higaki ................... G01C 11/00 382/103 |
| 2005/0078195 | A1* | 4/2005 | VanWagner ........... H04M 11/04 348/231.3 |
| 2005/0105765 | A1* | 5/2005 | Han ................... G06K 9/00295 382/100 |
| 2005/0181762 | A1* | 8/2005 | Kauppila .............. H04L 67/025 455/410 |
| 2005/0220450 | A1* | 10/2005 | Enomoto ................ G01S 17/08 396/104 |
| 2006/0004818 | A1* | 1/2006 | Claudatos ......... G06F 17/30082 |
| 2006/0067456 | A1* | 3/2006 | Ku ........................... G07C 9/00 377/6 |
| 2006/0198611 | A1* | 9/2006 | Park ........................ H04N 5/76 386/226 |
| 2007/0025612 | A1 | 2/2007 | Iwasaki et al. |
| 2007/0109134 | A1 | 5/2007 | Dugan et al. |
| 2007/0257985 | A1* | 11/2007 | Estevez .............. G06K 9/00369 348/143 |
| 2008/0025477 | A1* | 1/2008 | Farhan .................. G06Q 50/22 379/38 |
| 2008/0306805 | A1 | 12/2008 | Vajracharya et al. |
| 2010/0171846 | A1* | 7/2010 | Wood ................. H04N 1/00323 348/231.99 |
| 2011/0007962 | A1 | 1/2011 | Johnson et al. |
| 2011/0115885 | A1* | 5/2011 | Wernersson ......... H04N 5/2256 348/47 |
| 2012/0038954 | A1* | 2/2012 | Wang .................. H04N 1/3872 358/2.1 |
| 2012/0109715 | A1 | 5/2012 | Wu et al. |
| 2013/0090968 | A1 | 4/2013 | Borza |
| 2013/0222599 | A1 | 8/2013 | Shaw |
| 2013/0226539 | A1 | 8/2013 | Shaw |
| 2013/0226655 | A1 | 8/2013 | Shaw |
| 2013/0294646 | A1 | 11/2013 | Shaw |

OTHER PUBLICATIONS

Tian et al. "IBM Smart Surveillance System (S3): Event Based Video Surveillance System with an Open and Extensible Framework." In: Machine Vision and Applications, Oct. 2008. vol. 19, Issue 5-6, pp. 315-327 (online) [retrieved on May 3, 2013 (May 3, 2013)] Retrieved from the Internet <URL: http://www.andrewsenior.com/papers/TianMVA08.pdf>.

Citation Tian et al. "IBM Smart Surveillance System (S3): Event Based Video Surveillance System with an Open and Extensible Framework." In: Machine Vision and Applications, Oct. 2008. vol. 19, Issue 5-6, pp. 315-327 (online) [retrieved on May 3, 2013 (May 3, 2013)] Retrieved from the Internet <URL: http://link.springer.com/article/10.1007/s00138-008-0153-z#>.

Lim et al. "Video Processing Using FPGAs in Video Surveillance Systems—You can implement a DVR using the Xlinx Video IP Block Set." In: DSP Magazine, Apr. 2007, pp. 27-29 [online] [retrived on May 4, 2013 (May 4, 2013)] Retrived from the Internet <URL: http://data.eefocus.com/myspace/11/57561/bbs/1215221387/1215221497_1237d0bb.pdf>.

\* cited by examiner

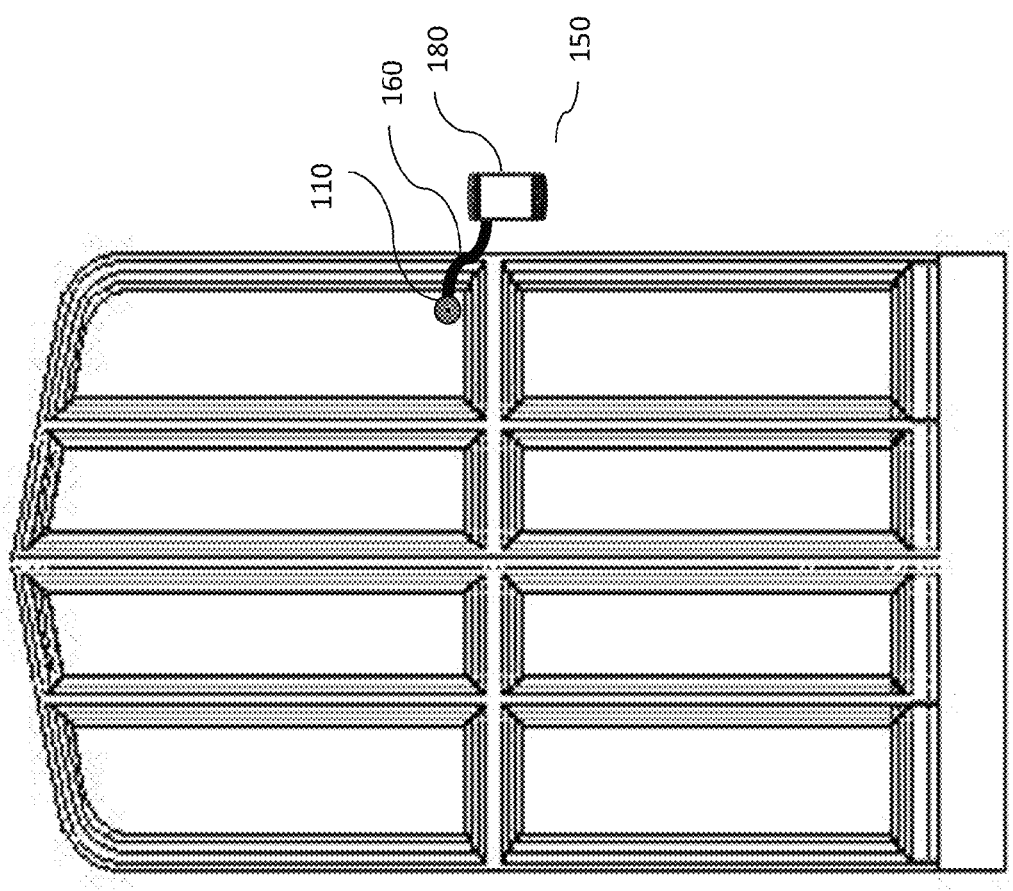

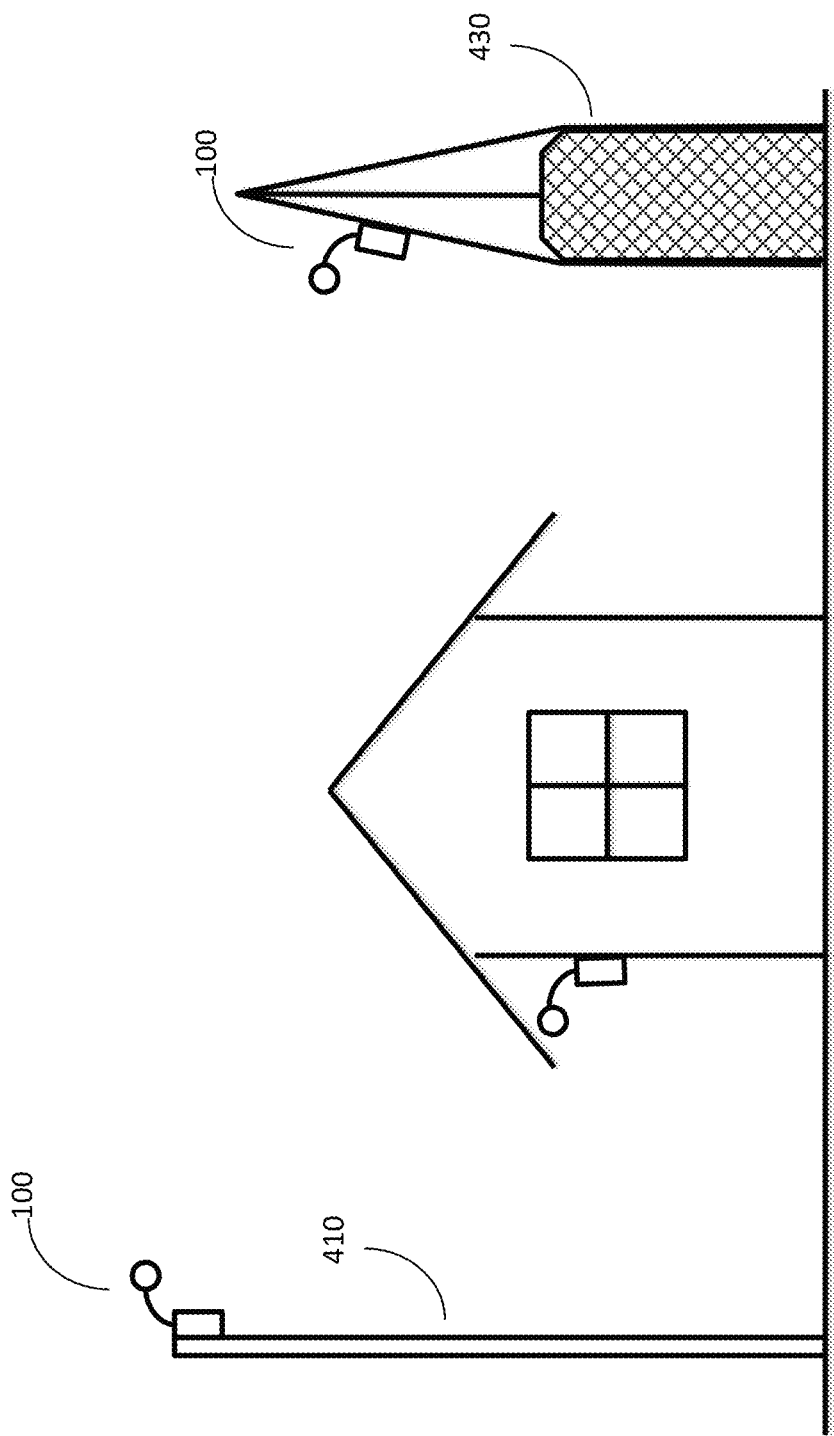

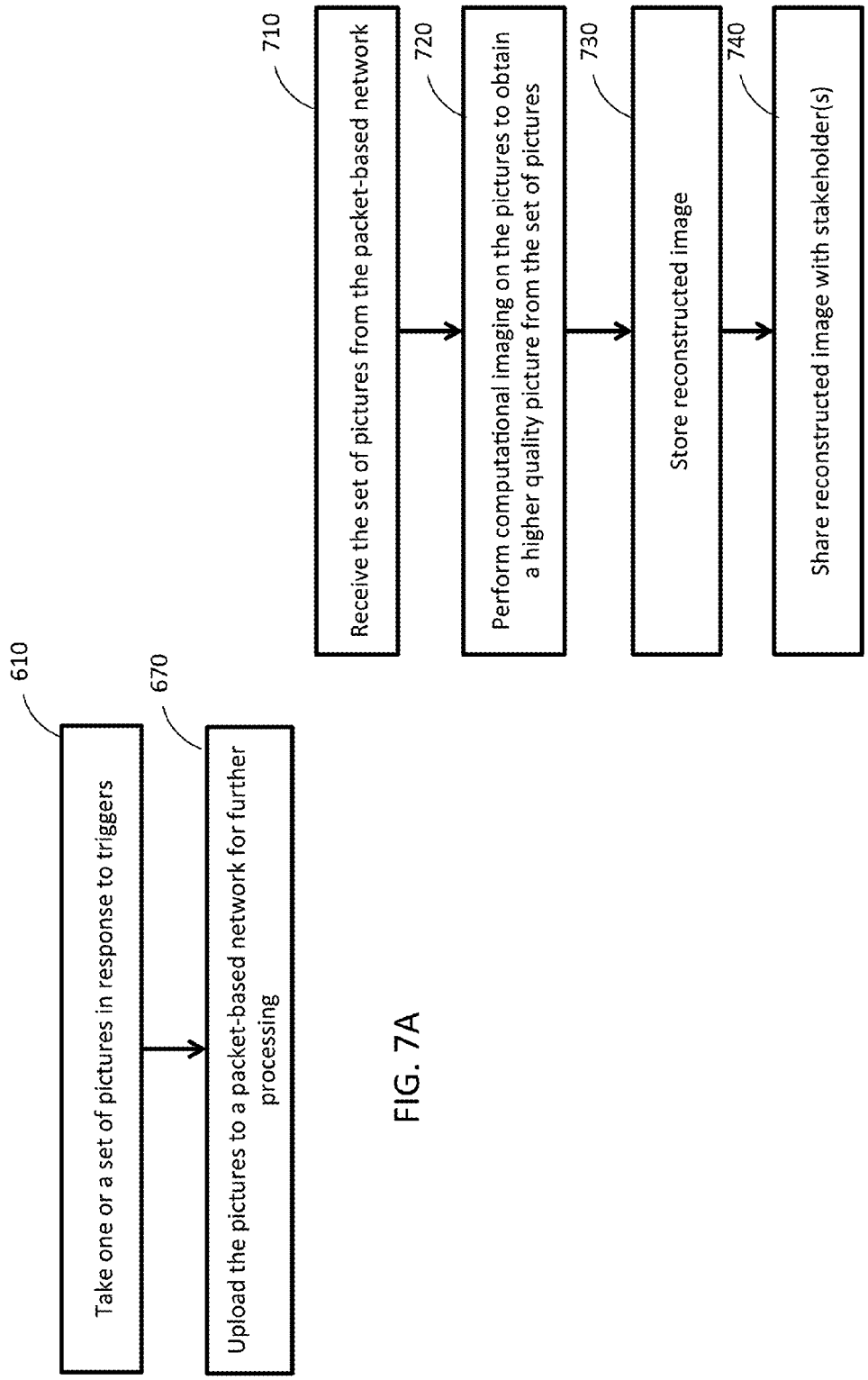

| 3rd party applications | | | | | | |
|---|---|---|---|---|---|---|
| Action scripts | Actions | Classification Databases | Processing Algorithms | UX Extensions | | |
| Action Engine Web App | | Classification Engine and Database App | Image Processing App | User Interface Web App | | |
| | | | | Ruby on Rails | | |
| Open CV + Octave | | | | | | |
| Libraries | | | | | | |
| Linux Virtual Machines | | | | | | |
| Amazon EC2 | | | | | | |

FIG. 7C

METHOD AND APPARATUS FOR VISUAL MONITORING

RELATED APPLICATION

The present application claims the benefit and priority to U.S. Provisional Application No. 61/580,629, entitled "Method and Apparatus for Visual Monitoring," filed on Dec. 27, 2011, which is incorporated herein by reference in its entirety.

TECHNICAL FIELD

Embodiments disclosed herein are related to communication devices, and more particularly to apparatus and method for visual monitoring via a packet-based network.

BACKGROUND

Visual Monitoring using digital cameras is finding more and more applications these days. However, most conventional systems for visual monitoring require specially designed cameras with their own proprietary operating systems, and human analysis of the images acquired by the cameras, making them expensive and inefficient and limiting their uses to only a few critical applications, such as security cameras systems

BRIEF DESCRIPTION OF THE DRAWINGS

FIG. 1E is a schematic drawing of a device for visual monitoring and its placement according to one embodiment.

FIGS. 4A-4C are schematic diagrams of devices for visual monitoring and their placements according to embodiments.

FIGS. 7A and 7B are flowcharts illustrating methods for visual monitoring performed by a device for visual monitoring and by a server, respectively, according to embodiments.

FIG. 7C illustrate a software stack at a server with which a device for visual monitoring is communicating according to embodiments.

DETAILED DESCRIPTION OF THE EMBODIMENTS

Figure 1A:
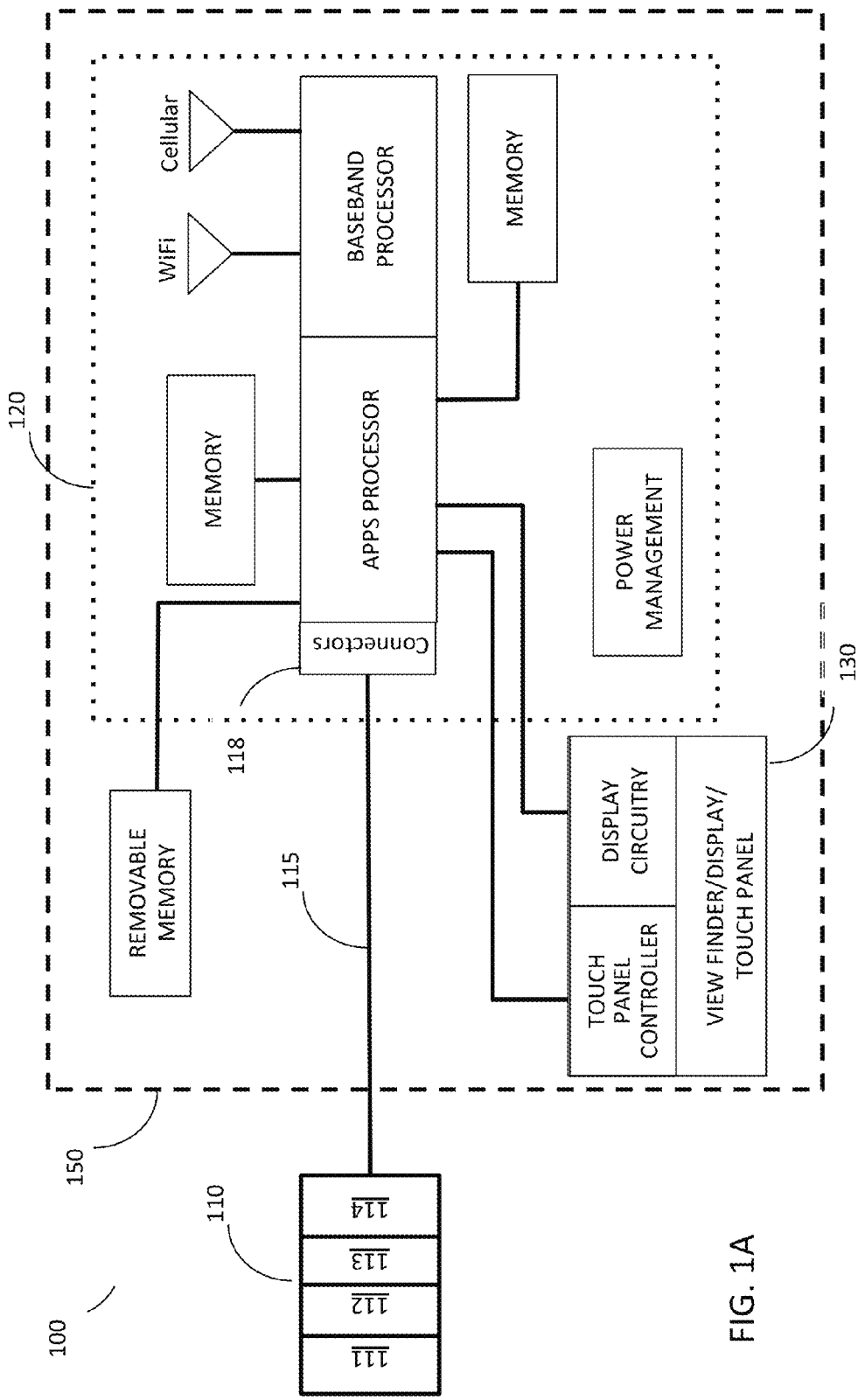
FIG. 1A is a block diagram of a device for visual monitoring according to one embodiment.

As illustrated in FIG. 1A, in one embodiment, a device for visual monitoring (VM device) 100 includes at least one camera heads 110 and a camera body 150. The camera body includes a mobile (or wireless) chipset 120, and optional display/input module 130. The camera heads and the mobile chipset are communicatively coupled via connections 115. Each camera head (or camera) 110 in turn includes one or more apertures 111, one or more lenses 112, one or more sensors 113, and connectors 114 coupled to connections 115. The one or more apertures 111 and lenses 112 may be in a different order than shown and may be interspersed to create a multi-aperture camera. The mobile chipset 120 can be any chipset designed for use in a mobile device such as a smartphone, personal digital assistant (PDA) device, or any other mobile computing device, and includes a group of integrated circuits, or chips, that are designed to work together in a mobile device. In one embodiment, the mobile chipset includes one or more processors, such as an apps processor and/or a baseband processor. The apps processor is coupled to the camera 110 via connectors 118, which is coupled to connections 115. Mobile chipset 120 may further includes one or more memory components for storing data and program codes. Apps processor executes application programs stored in one or more of the memory components to process images and/or videos captured by the camera 110. The memory components may include one or more memory chips including dynamic random access memory (DRAM) and/or flash memory. VM device 100 may further include one or more removable memory components, which may come in the form of one or more memory cards, such as SD cards, and can be used to store images captured by camera 110 and/or processed by the apps processor. The baseband processor processes communication functions (not shown) in order to transmit images processed by apps processor via a local area wireless (e.g. Wi-Fi) communication and/or a wide area network (e.g. cellular) communication. Mobile chipset 120 may further include a power management module, which is coupled to a battery (not shown) and/or an external power source (not shown), and which manages and supplies power to the electronic components in the VM device 100. The VM device 100 may also include one or more batteries and/or a power adaptor that converts AC power to DC power for use by the VM device.

The optional display/input module 130 may include a display (e.g., LCD display) that displays preview images, still pictures and/or videos captured by camera 110 and/or processed by the apps processor, a touch panel controller (if the display is also used as an input device), and display circuitry.

In some embodiments, the camera body includes all or part of a mobile device, such as a smartphone, personal digital assistant (PDA) device, or any other mobile computing device.

Figure 1B:
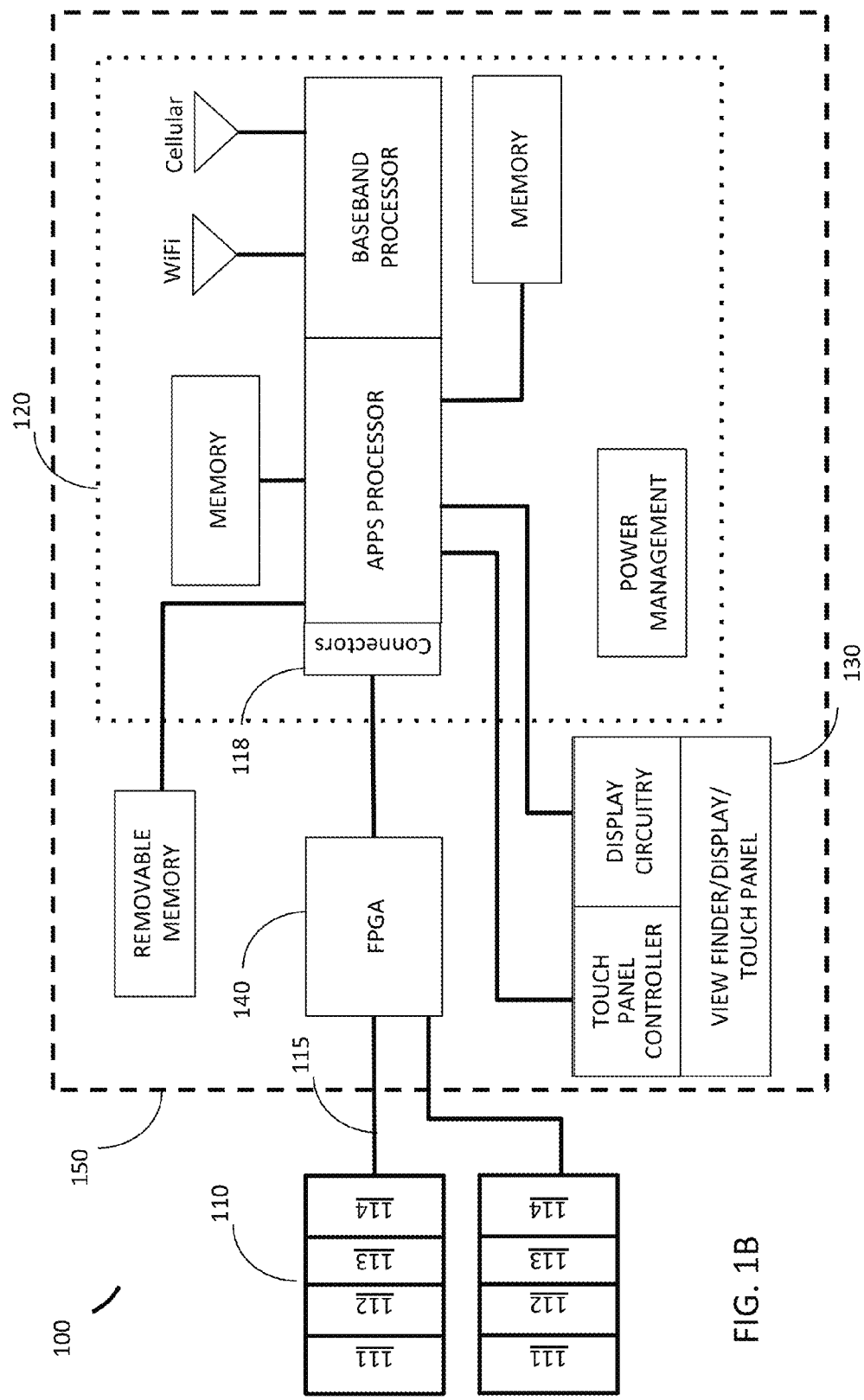
FIG. 1B is a block diagram of a device for visual monitoring according to another embodiment.

In some embodiments, when the VM device 100 includes more than one camera, as shown in FIG. 1B, the VM device may also includes a field-programmable gate array (FPGA) chip 140 coupled between the cameras and the mobile chipset. The FPGA chip may be used to multiplex signals between the cameras and the apps processor, and to perform certain image processing functions, as discussed below.

Figure 1D:
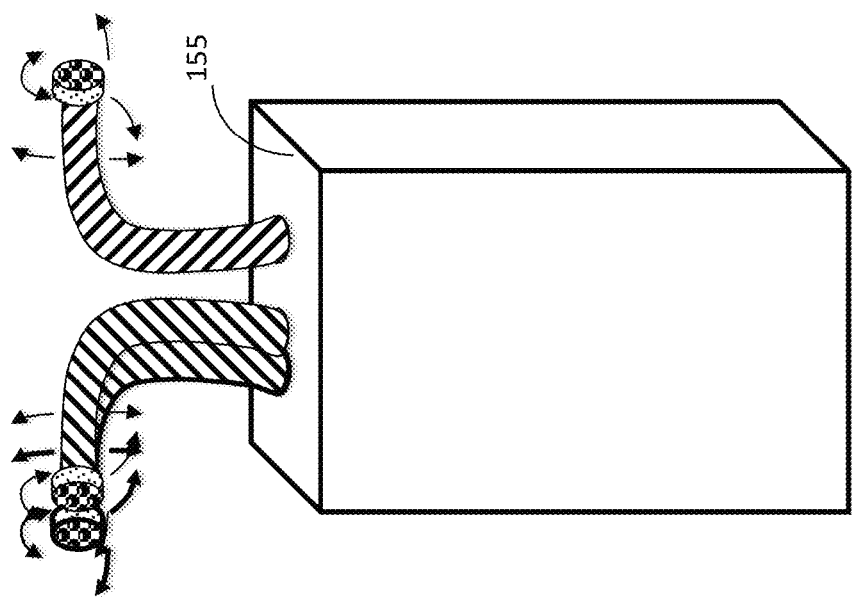
FIGS. 1C and 1D are schematic drawings of a device for visual monitoring according to one embodiment.
Figure 1C:
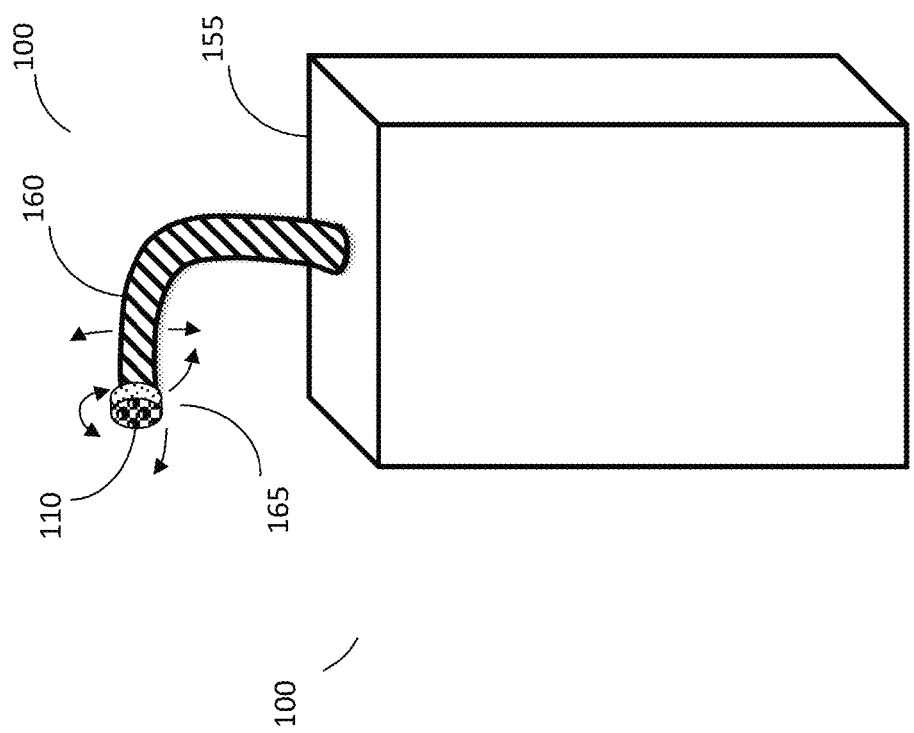

In some embodiments, camera 110 and camera body 150 may be disposed in a same housing (not shown). In some embodiments, as shown in FIGS. 1C and 1D, the one or more cameras 110 are disposed at the heads of one or more support stalks 160, while the camera body 150 is disposed in a separate housing 155. In some embodiments, the housing is weather proof so the VM device 100 can be mounted outdoors. The stalks are flexible so that the heads can be positioned to face different directions giving a wider field of view. Furthermore, the cameras disposed in one or more protective housing 165 with transparent face and/or a sun visor (not shown), and mechanisms are provided to allow the camera(s) to swivel so that the images captured by the camera can be kept oriented correctly no matter which direction the camera is facing. This swivel motion can be limited (e.g. plus or minus 180 degrees) with pins as stops so that the cable inside of the stalk does not become too twisted. In addition, the sun visor will also be able to swivel so that the top part shields the lens from the sun. The stalks and the swivel head allow cameras 110 to be positioned to capture desired images without moving the body 155 of the VM device 100. In some embodiments, wired connections 115 shown in FIGS. 1A and 1B include a flexible cable inside the stalks. The stalks may be stiff enough to support their own weight and resist wind forces. For ease of discussion, the camera(s) on a stalk, the camera housing at the stalk head, the swivel mechanism (if provided), and the cables in the stalk are together called an eyestalk in the following discussions.

In some embodiments, as shown in FIG. 1E, the "eyestalk" is an extension of a camera of a smartphone for a small footprint in a store display. A conventional smartphone has the camera fixed to the body of the smartphone. To create an eyestalk, a stalk 160 in the form of an extension cable is added between the camera and the rest of the smartphone 180, so that the camera can be extended away from the smartphone 180. The smartphone 180 can be mounted away from view, while the camera can be extended via it's stalk into the viewing area of the store display or at a small corner of a store window. This way the smartphone has access to the view outside the store, but only the camera is visible. Since the size of the camera is much smaller than the rest of the smartphone, the camera 110 takes a very small footprint in a store display.

In one embodiment, the camera 110 may include one or more fish eye lens via an enclosing mount. The mount will serve the purposes of: 1) holding the fish eye lens in place; 2) mounting the whole camera 110 to a window with an adhesive tape; 3) protecting the smartphone; and 4) angling the camera slightly downwards or in other directions to get a good view of the store front. The fish eye lens will allow a wide field of view (FOV) so that as long as the mount is placed around human eye level, the VM device 100 can be used for counting or moving objects via a tripline method, as discussed below. This allows for the VM device 100 to be easily installed. A user simply needs to peel off the adhesive tape, mount the device around eye level to the inside window of a store display, and plug into a power supply. Optionally, the VM device 100 can be connected to a WiFi hotspot, as discussed below. Otherwise, cellular connection, such as 3G, will be used by the VM device 100 as default.

In other embodiments, camera 110 is connected to the camera body via wireless connections (e.g., Bluetooth connection, Wi-Fi, etc.). In some embodiments, VM device 100 is a fixed install unit for installing on a stationary object.

Figure 2:
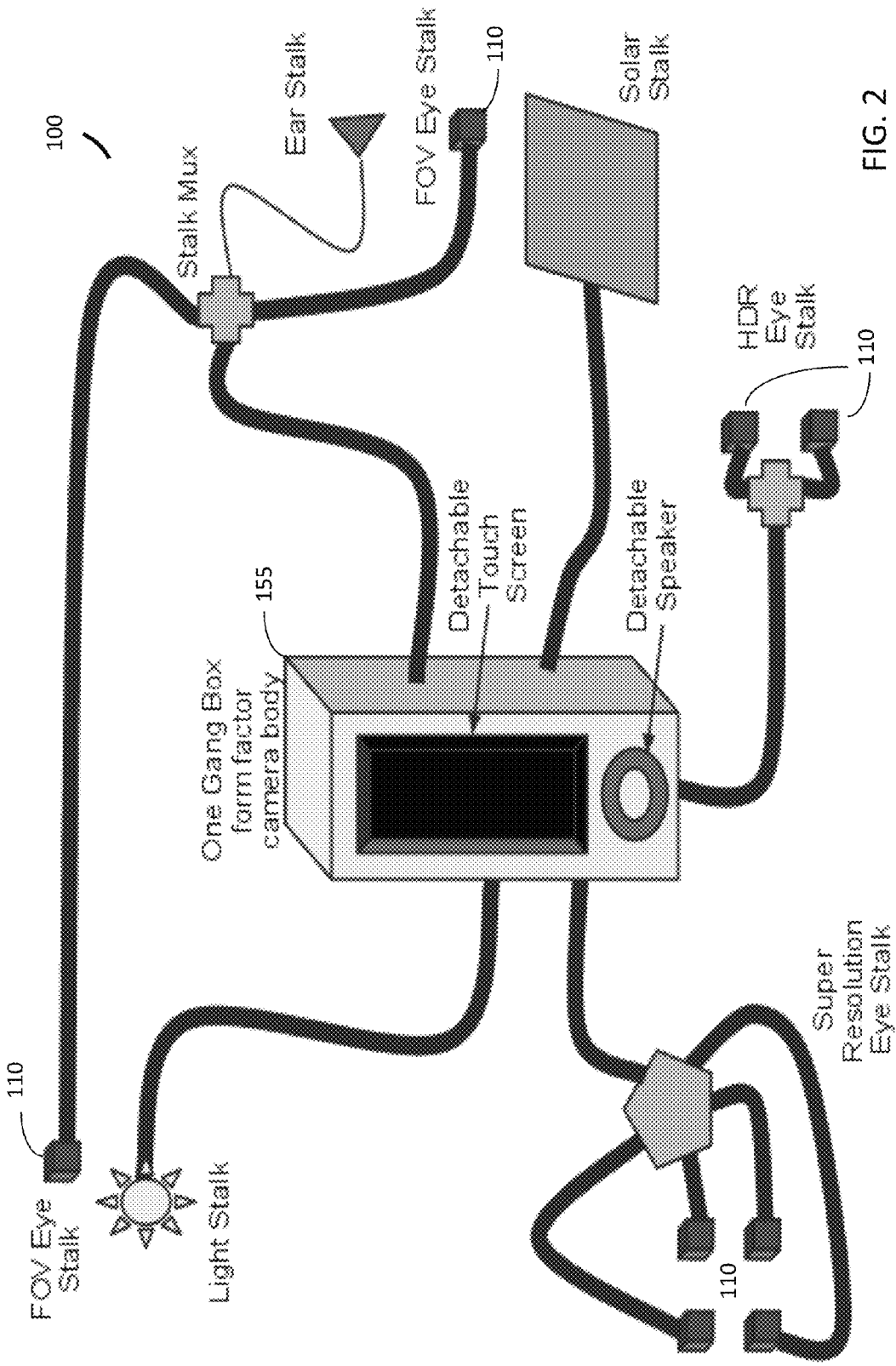
FIG. 2 is a schematic drawing of a device for visual monitoring according to another embodiment.

FIG. 2 illustrates VM device 100 according to some embodiments. As shown in FIG. 2, VM device 100 may include a plurality of eyestalks, a light stalk that provide illumination, and a solar stalk that provides power for the VM device 100. As shown in FIG. 2, multiple eyestalks can be connected to the camera body via a stalk mux. The stalk mux may include a field programmable gate array (FPGA) and/or other type of circuit embodiment (e.g. ASIC) (not shown) that is coupled between camera 110 and the apps processor. Alternatively, the stalk mux may be part of the camera body and may include a field programmable gate array (FPGA) or other type of circuit embodiment (e.g. ASIC) (not shown) that is coupled between camera 110 and the apps processor. Additionally or alternatively, multiple cameras can be used to form a high dynamic range (HDR) eyestalk, low light eyestalks, clock phase shifted high-speed camera eyestalk, and/or a super resolution eyestalk configurations. Coded apertures (not shown) and/or structured light (not shown) may also be used to enhance the pictures from the cameras. There may also be a field of view (FOV) eyestalk by having the cameras pointed in different directions. To handle the higher pixel rate caused by multiple eyestalks, compressive sensing/sampling is used to randomly sub-sample the cameras spatially and temporally. The random sub-sample can happen by having identical hash functions that generates quasi-random pixel addresses on both the camera and device reconstructing the image. Another way is for the FPGA to randomly address the camera pixel array. Yet another way is for the FPGA to randomly skip pixels sent by the camera module. The compressively sampled picture can then be reconstructed or object recognition can be done either at the VM device or in the cloud. Another way of handling the higher pixel rate of multiple eyestalks with the processing power normally used for one eyestalk is to JPEG compress each of the picture at the camera so that the data rate at the apps processor is considerably less. Alternatively, the FPGA may read the full pixel data from all the cameras and then compress the data down before it is sent to the apps processor. Another alternative is for the FPGA to calculate visual descriptors from each of the eyestalks and then send the visual descriptors to the apps processor. For field of view eyestalks, a smaller rectangular section of the eyestalks can be retrieved from the eyestalk and sent to the apps processor. Another alternative is for the FPGA or Apps processor to extract and send only patches of the picture containing relevant information (e.g., license plate image patch vs. a whole scene in a traffic-related application). A detachable viewfinder/touchscreen may also be tethered permanently or temporarily as another stalk or attached to the camera body. There may also be a cover for the viewfinder/touchscreen to protect it. In some embodiments, the camera body 150 with the viewfinder/touchscreen is enclosed in a housing 155, which may be weather-proof and which may include a window for the view-finder. The view finder can be activated when the camera is first powered on for installation, when is display is activated over a network, and/or when the camera is shaken and the camera accelerometer senses the motion.

Figure 3:
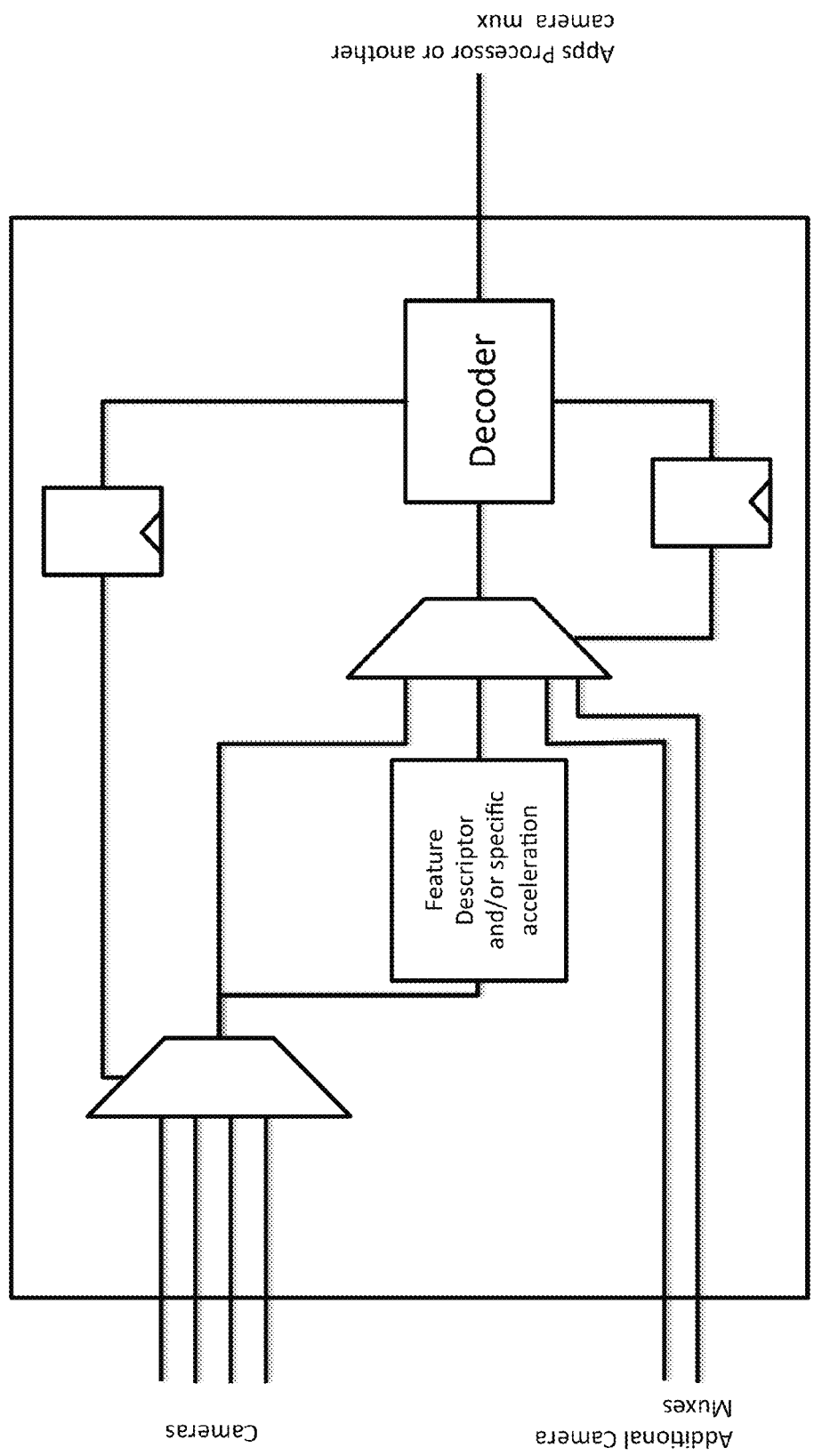
FIG. 3 is a block diagram of a FPGA chip in a device for visual monitoring according to one embodiment.

FIG. 3 is a schematic diagram of the FPGA chip 140 coupled between multiple cameras and the apps processor. The FPGA chip 140 may be placed inside the housing 155 of the camera body 155 or close to the cameras 110 in a separate housing.

Figure 4B:
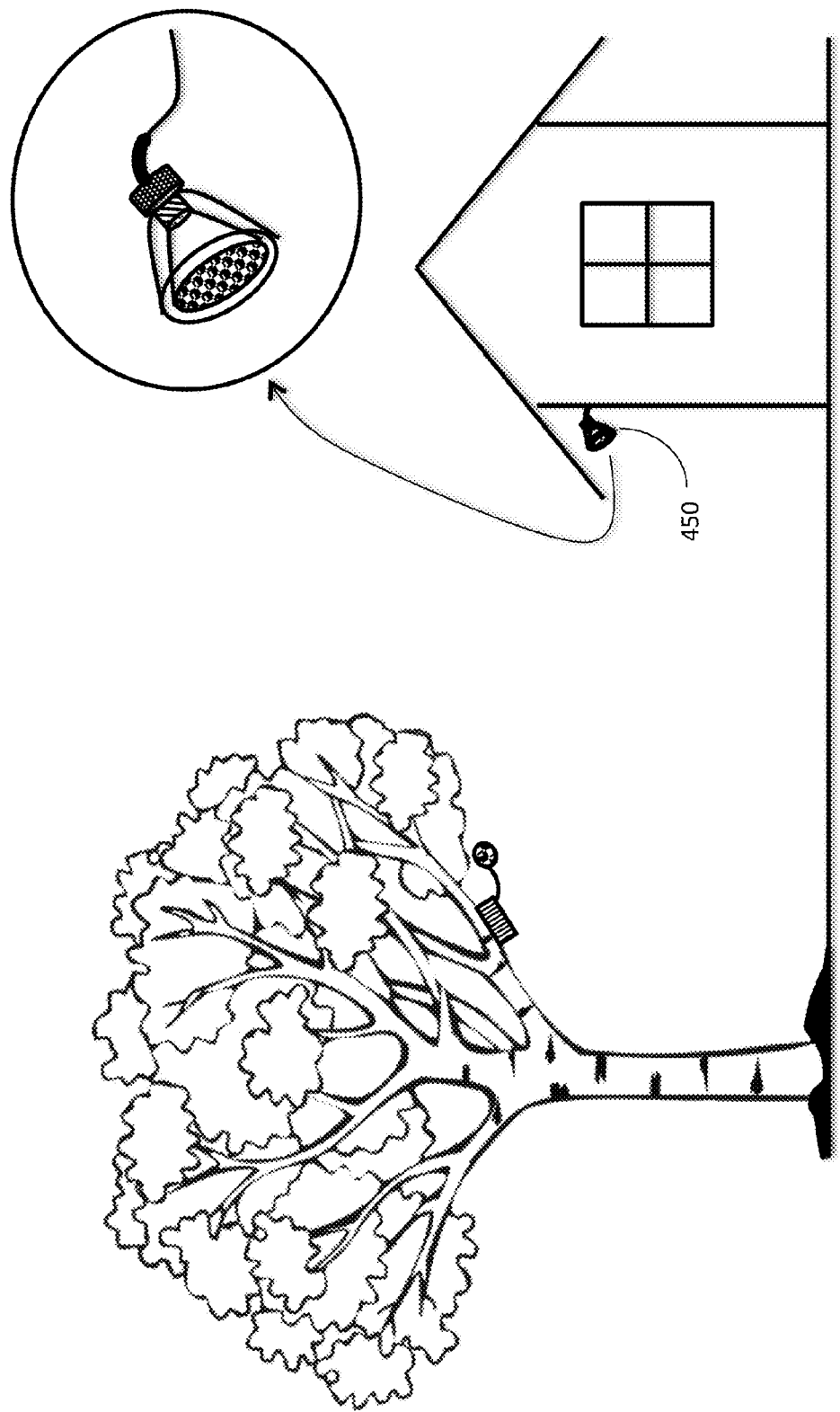
Figure 4C:
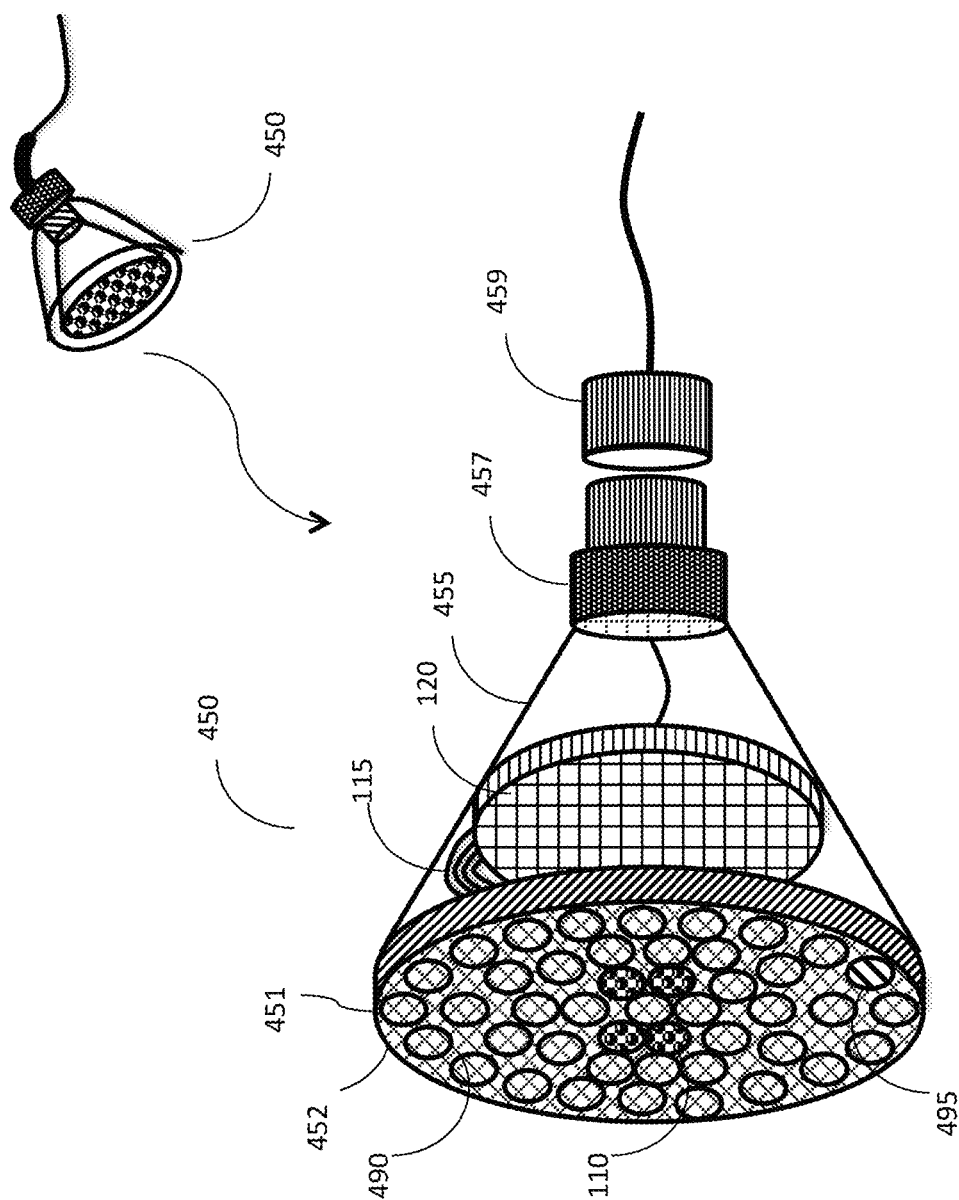

FIGS. 4A and 4B illustrate some applications of VM device 100. As shown in FIG. 4A, VM device 100 may be installed on a power pole 410 that is set up during the construction of a structure 420, or on or in the structure 420 itself. It may also be installed on or even integrated with a portable utility (e.g., a porter potty with integrated temporary power pole) 430. In one embodiment, the porter potty also serves as a support structure for power wires that provide temporary power for the construction of the structure. As shown in FIG. 4A, VM device 100 includes one or more eyestalks that can be adjusted to position the camera(s) 110 to capture desired images or videos of structure and/or some of its surroundings. As shown in FIG. 4B, VM device 100 may also be installed on a natural structure such as a tree. Further, as shown in FIGS. 4B and 4C, VM device 100 may also be configured as a bulb replacement 450 and attached to a lamp or light fixture.

When VM device 100 is configured as a bulb replacement 450, the cameras 110 may be placed by themselves or among light emitting elements 451, such as LED light bulbs, behind a transparent face 452 of the bulb replacement. The mobile chipset 120 may be disposed inside a housing 455 of the bulb replacement, and a power adaptor 457 is provided near the base of the bulb replacement, which is configured to be physically and electrically connected to a base 459 of the lamp or light fixture, which is configured to receive a light bulb or tube that is incandescent, fluorescent, halogen, LED, Airfield Lighting, high intensity discharge (HID), etc., in either a screw-in or plug in manner, or the like. A timer or a motion sensor (such as an infrared motion sensor) 495 may also be provided to control the switching on and off of the light emitting elements. There can also be a mechanism (not shown) for some portion of the light bulb to rotate while the base of the bulb stays stationary to allow the cameras to be properly oriented.

Figure 5A:
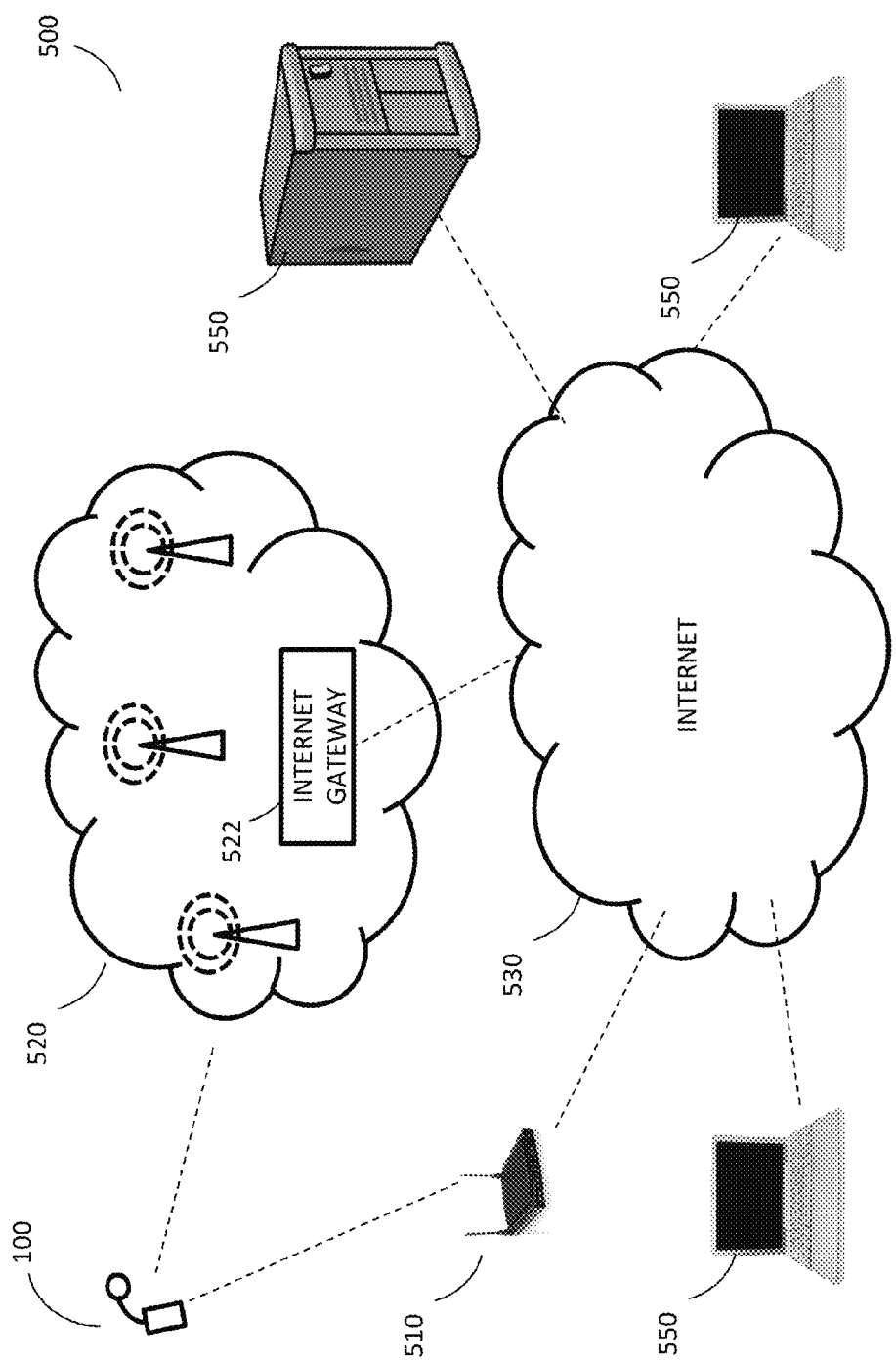
FIG. 5A is a block diagram of a packet-based network communicatively coupled to a device for visual monitoring according to one embodiment.

As shown in FIG. 5A, VM device 100 includes WiFi and/or cellular connections to allow it to be connected to a packet-based network 500 (referred sometimes herein as "the cloud"). In some embodiments, the packet-based network may include a WiFi hotspot 510 (if one is available), part or all of a cellular network 520, the Internet 530, and computers and servers 550 coupled to the Internet. When a WiFi hotspot is available, VM device 100 may connect to the Internet via the WiFi hotspot 510 using its built-in WiFi connection. VM device 100 may also communicate with the cellular network 520 using its built-in cellular connection and communicate with the Internet via an Internet Gateway 522 of the cellular network. The VM device might also communicate with the cloud 100 using wired ethernet and optionally Power over Ethernet (PoE) (not shown).

Figure 5B:
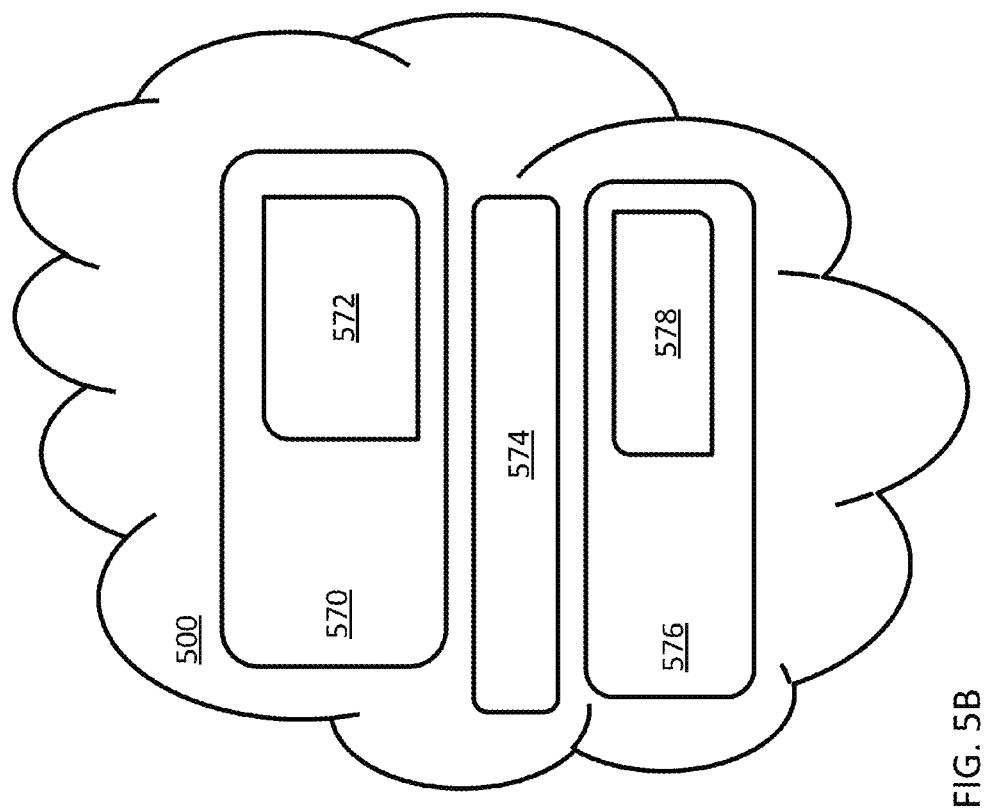
FIGS. 5B and 5C are block diagrams illustrating a software stack in a device for visual monitoring and software engines in the packet-based network according to embodiments.
Figure 5B:
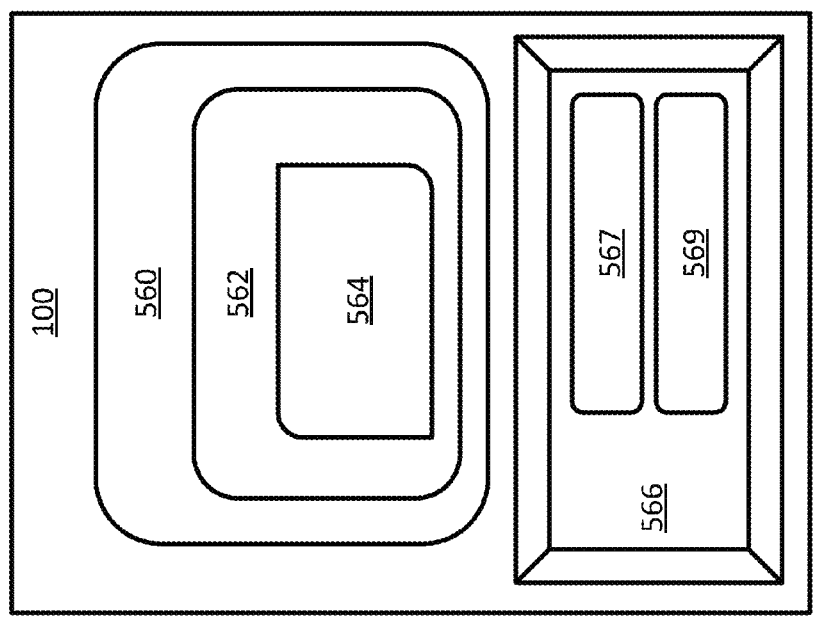

FIG. 5B illustrates a software architecture associated with VM device 100 according to embodiments. As shown in FIG. 5B, VM device 100 is installed with a mobile operating system 560 (such as the Android Operating System or any other operating system configured to be used in mobile devices such as smartphones and PDA's), and one or more camera application programs (Camera App) 562 built upon the mobile operating system. The Camera App 562 may be a standalone program or a software platform that serves as a foundation or base for various feature descriptor and trigger specific script programs. When multiple eyestalks are used, VM device 100 further includes functions provided by a chip (e.g. FPGA, ASIC) 566, such as image multiplexing functions 567 and certain image processing functions such as feature/visual descriptor specific acceleration calculations (hardware acceleration) 569. Hardware acceleration may also be used for offloading a motion detection feature from the Camera App.

In some embodiments, the mobile operating system is configured to boot up in response to the VM device being connected to external AC or DC power source (even though the VM device 100 includes a battery). In some embodiments, the VM device is configured to launch the Camera App automatically in response to the mobile operating system having completed its boot-up process. In addition, there can be a remote administration program so that the camera can be diagnosed and repaired remotely. This can be done by communicating to this administration app through the firewall via for example email, SMS, contacts, c2dm and sending shell scripts or individual commands that can be executed by the camera at any layer of the operation system (e.g., either at the Linux layer and/or the Android layer). Once the scripts or commands are executed, the log file is sent back via email or SMS. There can be some sort of authentication to prevent hacking of the VM device via shell scripts.

In some embodiments, VM device 100 communicates with servers 550 coupled to a packet-based network 500, which may include one or more of software engines, such as an image processing and classification engine 570, a video stream storage and server engine 574, and an action engine 576. The image processing and classification engine 570 (built, for example, on Amazon's Elastic Computing Cloud or EC2e) may further include one or more classifier specific script processors 572. The image processing and classification engine 570 may include programs that provide recognition of features in the images captured by the VM device 100 and uploaded to the packet-based network 500. The action engine 576 (such as the one on Amazon's EC2) may include one or more action specific script processors 578. The video stream storage and server engine 574 may also be used to process and enhance images from the IP camera using, for example, multi-frame High Dynamic Range, multi-frame Low Light enhancement, multi-frame super-resolution algorithms or techniques.

Figure 5C:
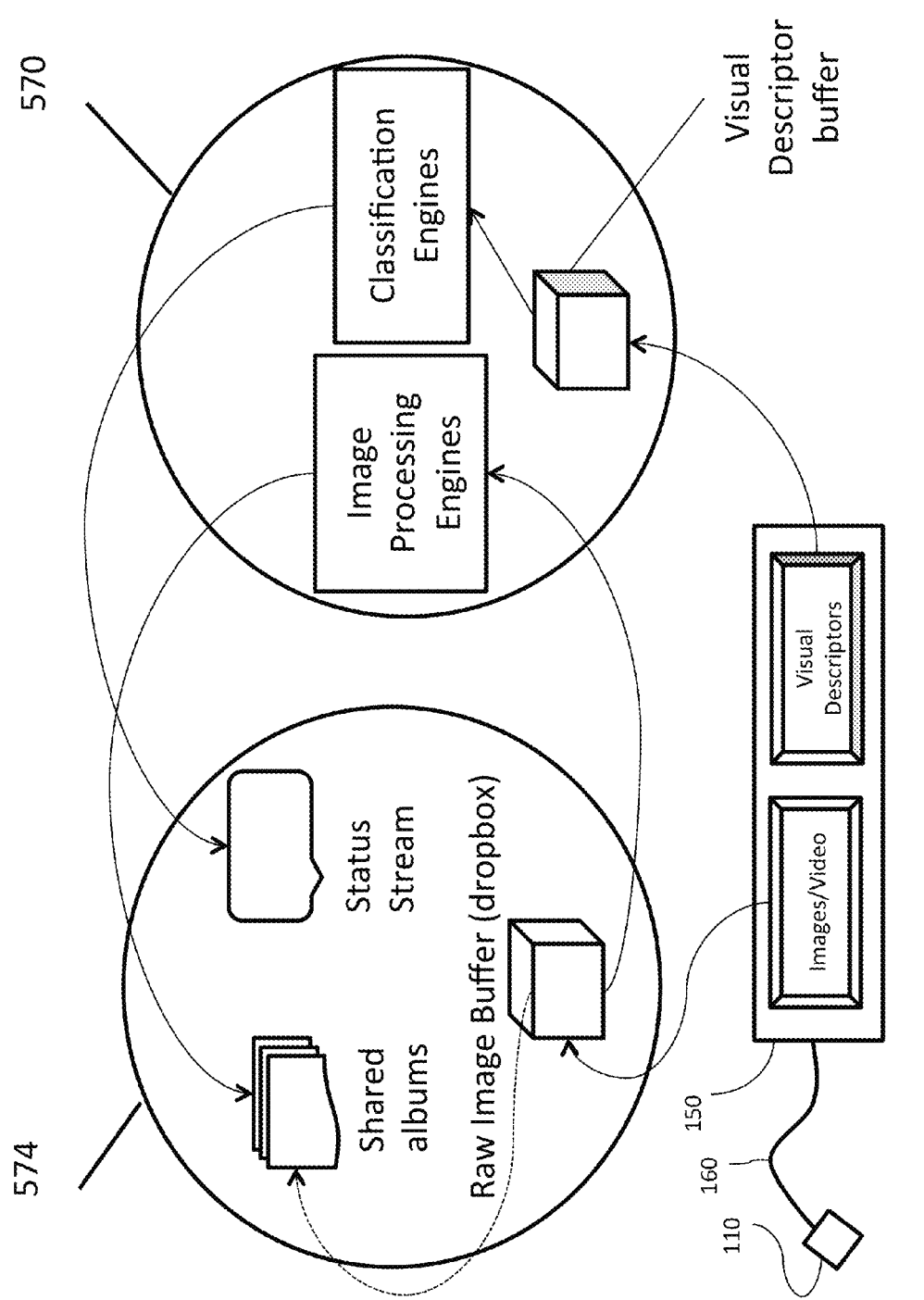

As shown in FIG. 5C, still images and/or videos uploaded from the VM device are first stored in a raw image buffer associated with the video stream storage and server engine 574 (such as Google+), which host one or more social networks, and then transmitted to image processing engines 570, which processes the images/videos and transmit the processed images/videos to shared albums associated with the video stream storage and server engine 574. Another possible configuration is for the VM device 100 to upload video directly to the Image Processing and Classification Engines 570 on EC2 which then processes the data and sends it to the Video Stream Storage server 574 on Google+ (not shown).

As also shown in FIG. 5C, images and data for visual descriptor calculations are uploaded from the VM device 100 to a visual descriptor buffer 571 associated with the image processing and classification engines 570. Classification engines in the image processing and classification engines 570 perform visual descriptor classification on visual descriptors from the visual descriptor buffer and transfer the resulting classification information to a status stream folder associated with the video stream storage and server engine.

Figure 6A:
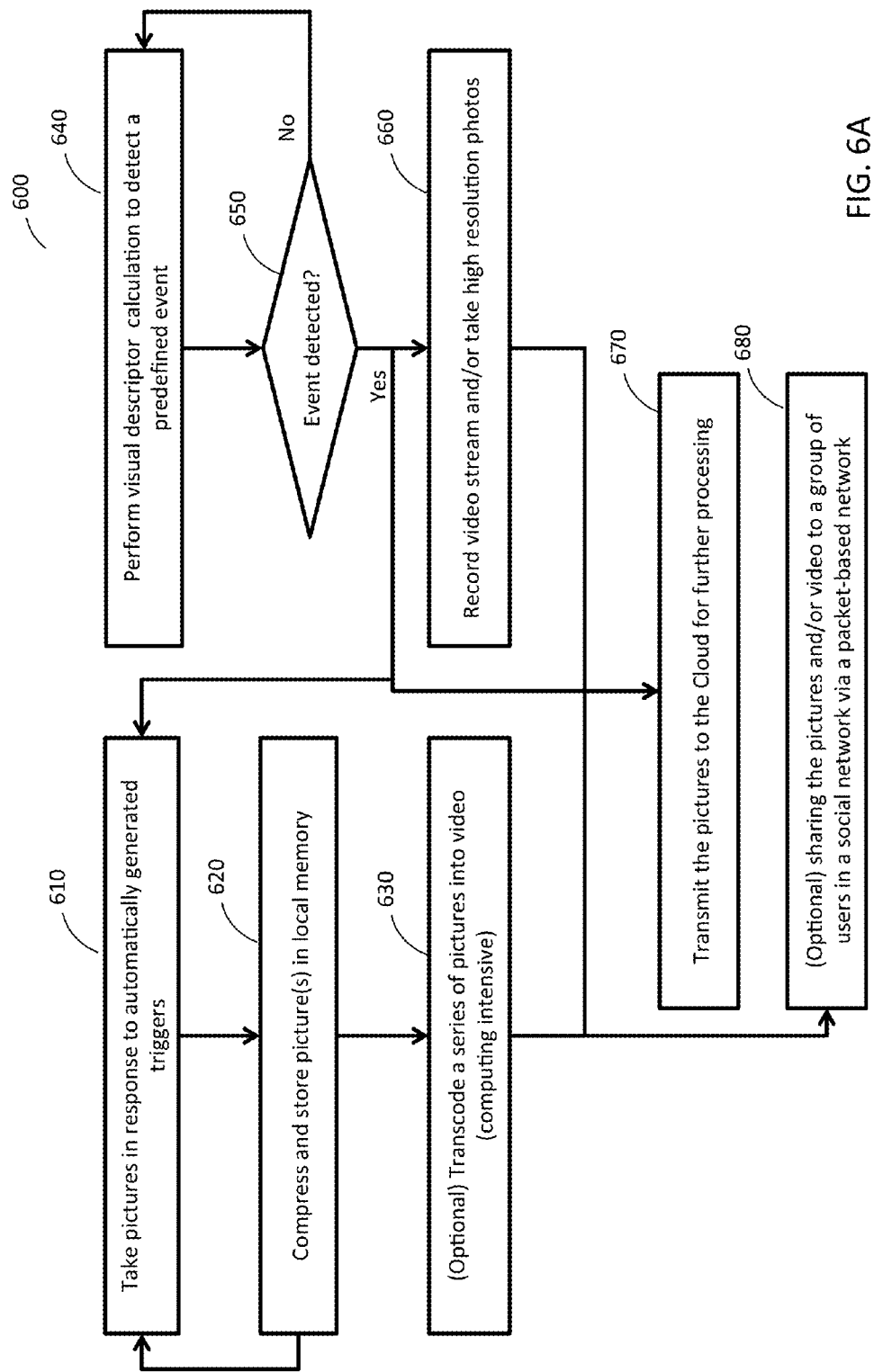
FIG. 6A is a flowchart illustrating a method for visual monitoring according to embodiments.
Figure 6B:
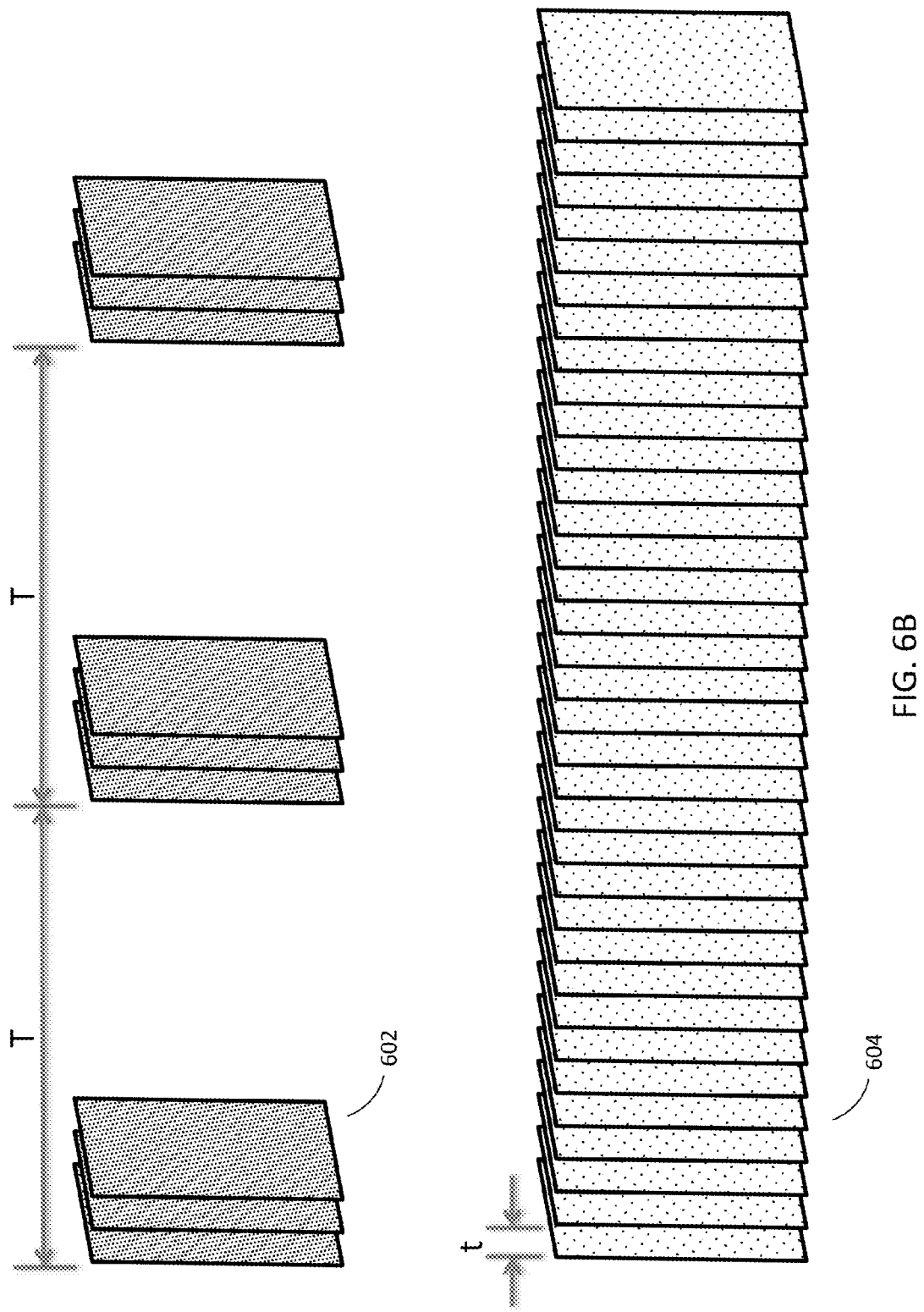
FIG. 6B is a schematic diagram illustrating images taken by a device for visual monitoring according to embodiments.

FIG. 6A illustrate a method 600 performed by VM device 100, when the Camera App and/or one or more application program built upon the Camera App are executed by the apps processor, to capture, process, and upload images/videos according to embodiments. As shown in FIGS. 6A and 6B, VM device 100 is configured to take pictures 602 in response to automatically generated triggers (610). In one embodiment, the triggers come from an internal timer in the VM device, meaning that VM device 100 takes one or a set of relatively high resolution pictures for each of a series of heart-beat time intervals T (e.g., 5 sec). In other embodiments, the triggers are generated by one or more application programs within or associated with the Camera App as a result of analyzing preview images 604 acquired by the camera(s) 110. In either case, the triggers are automatically generated requiring no human handling of the VM device 100. In some embodiments, the pictures are compressed and stored in local memory (620), such as the flash memory or removable memory and may optionally be transcoded into video before being uploaded (630). The pictures are uploaded (670) to one or more servers 650 in the cloud 500 for further processing. In some embodiments, the pictures are selected so that a picture is uploaded (670) only when it is significantly different from a predetermined number of prior pictures.

VM device 100 is also configured to perform visual descriptor and classification calculation (640) using, for example, low resolution preview images 604 from the camera(s), which are refreshed at a much more frequent pace (e.g. one image within each time interval t, where t<<T), as shown in FIG. 6B. In some embodiments, t can be in the order of microseconds (e.g., t=50 microseconds). The relatively low-resolution images are analyzed by VM device 100 to detect an interested event (such as a person entering or exiting a premise, or a significant change between two or more images) (640). Upon detection of such event (650), VM device 100 may be configured to record a video stream or perform computation for resolution enhancement of the acquired images (660).

In some embodiments, VM device 100 is further configured to determine whether to upload stored high resolution pictures based on certain criteria, which may include whether there is sufficient bandwidth available for the uploading (see below), whether a predetermined number of pictures have been captured and/or stored, whether an interested event has been detected, etc. If VM device 100 determines that the criteria are met, e.g., that bandwidth and power are available, that a predetermined number of pictures have been captures, that a predetermined time has passed since last uploading, and/or that an interested event has been recently detected, VM device 100 may upload the pictures or transcode/compress pictures taken over a series of time intervals T into a video using inter-frame compression and upload the video to the packet based network. In some embodiments, the high-resolution pictures are compressed and uploaded without being stored in local memory and transcoded into video previously. In some embodiments, the camera is associated with a user account in a social network service and uploads the videos or pictures to the packet based network together with one or more identifiers that identify the user account in the social network service, so that the pictures or videos are automatically shared among interested parties or stakeholders that were given permission to view the video through the social network service once they are uploaded (680).

In some embodiments, upon detection of an interested event, a trigger is generated to cause the VM device to take one or a set of pictures and upload the picture(s) to the packet-based network. In some embodiment, VM device 100 may alternatively or additionally switch on a video mode and start to record video stream and/or take high resolution pictures at a much higher pace than the heartbeat pictures. The video stream and/or high resolution high frequency pictures are uploaded to the packet-based network as quickly as bandwidth allows to allow quick viewing of the interested event by users. In some embodiments, the camera uploads the videos or pictures to the packet-based network together with one or more identifiers that identify the user account in the social network service so the pictures are automatically shared among a predefined group of users of the social network service.

VM device 100 may be further configured to record diagnostic information and send the diagnostic information to the packet-based network on a periodic basis.

As shown in FIG. 7A, VM device 100 takes one or a set of pictures in response to each trigger (610). The set of pictures are taken within very short time, which can be the shortest time the VM device can take the set of pictures. The set of pictures can be taken by one or multiple cameras that are placed closely together, and are used for multi-frame/multi-eyestalks high dynamic range (HDR), low-light or super resolution calculation performed at the VM device or in the servers.

As shown in FIGS. 7A and 7B, when the HDR or super resolution calculation is performed in the cloud 500, the set of pictures taken by the VM device in response to each trigger are uploaded (670) to the packet-based network for further processing. A server receiving the set of pictures (710) performs computational imaging on the pictures to obtain a higher quality picture from the set of pictures (720). The higher quality picture is stored (730) and/or shared (740) with a group of members of a social network, the members being associated with respective ones of a group of people or entities (e.g., stakeholders of a project being monitors), who have been given permission to view the pictures.

The server may also perform computer vision computations to derive data or information from the pictures, and share the data or information, instead of pictures, with the one or more interested parties by email or posting on a social network account.

FIG. 7C is a block diagram of a software stack at the server that performs the method shown in FIG. 7B and discussed in the above paragraphs. The server is based in the cloud (e.g. Amazon EC2). One or more virtual machines are run in the cloud using an operating system (e.g., Linux). These virtual machines can have many libraries on them, and in particular, libraries like Open CV and Rails. Open CV can be used to do image processing and computer vision functions. Rails can be used to build interactive websites. Other programs (e.g., Octave) can be run to do image processing and computer vision functions. Ruby can be used on Rails to build websites. The Action Engine web app function can be built on the aforementioned software stack to conduct specific actions when triggered by an event. For instance, in an application of using the VM device to monitor a parking lot, if a parking spot being monitored becomes available, the action engine can notify a mobile device of the driver of a car nearby who is looking for a parking spot. These actions can be added with action scripts (e.g. when parking spot is available, notify driver), and actions (e.g. send message to driver's smartphone) via APIs. One sensor platform can watch to see how many vehicles are entering a street segment and another sensor platform can watch to see how many cars are leaving a street segment. Often these sensor platforms will be placed on corners for greatest efficiency. All the entries and exits of a street segment need to be monitored by the sensor platforms to track to see how many vehicles are in a street segment. Also, signatures of the vehicles can be generated using visual descriptors to identify which vehicles have parked in a street segment vs. passed through a street segment. Using this method, the system can tell how many vehicles are parked in a street segment. This information can be used to increase the parking enforcement efficiency because segments with over parked vehicles are easily identified and/or helping drivers identify areas where there is parking available. The Classification engine and database app can try to match visual descriptors sent to the server by the camera to identify the object or situation in the database. Classification databases (e.g. visual descriptors for different cars) can be added via APIs for specific applications. The Image Processing App can process images (e.g. create HDR or super-resolution images). Additional processing algorithms can be added via APIs. There can also be a web app that can provide a GUI for users to control the camera via the web browser. This GUI can be extended by third-parties via APIs.

Figure 8:
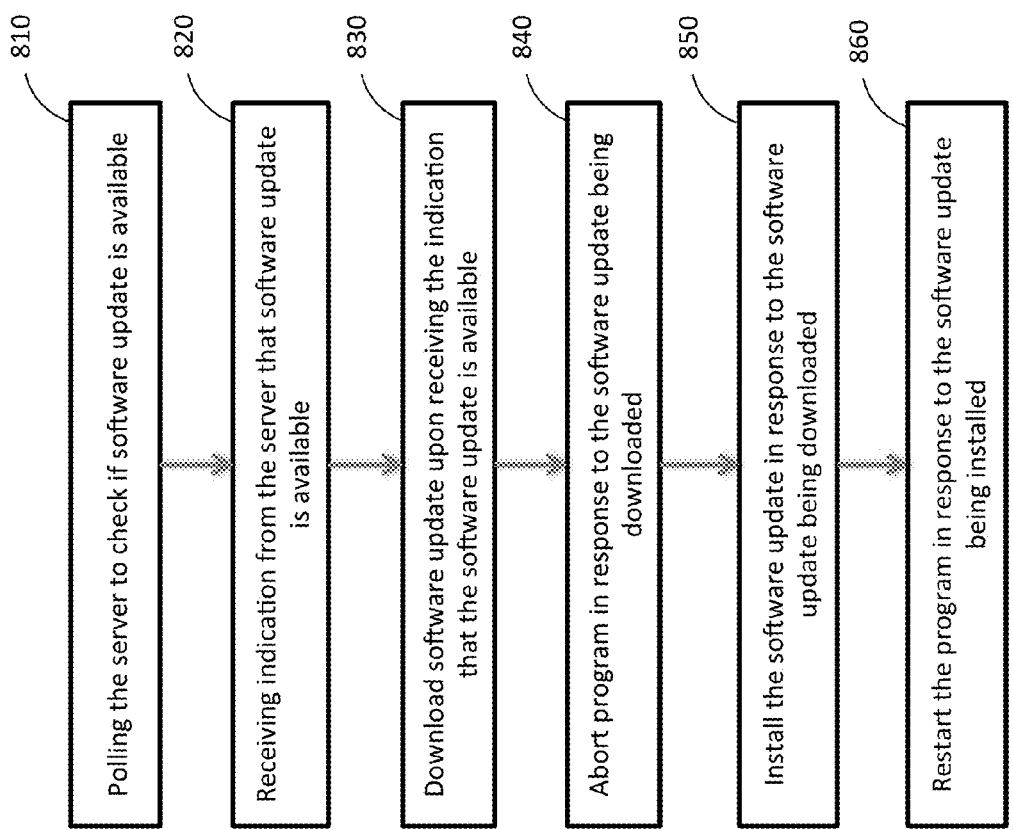
FIG. 8 is a flowchart illustrating a method for software updating at a device for visual monitoring according to an embodiment.

In some embodiments, VM device 100 is also loaded with a software update program to update the Camera App 562 and/or associated application programs 564. FIG. 8 is a flowchart illustrating a process performed by the VM device 100 when the software update program is being executed by the apps processor. As shown in FIG. 8, the VM device 100 polls (810) a server storing software for the VM device 100 to check if software update is available. When the VM device 100 receives (820) indication from the server that software updates are available, it downloads (830) software updates. In response to the software updates being downloaded, the VM device 100 would abort (840) the visual monitoring program discussed above so as to install (850) the software update. The VM device 100 would restart the program (860) in response to the software update being installed. In one embodiment, all of the steps illustrated in FIG. 8 are performed automatically by the VM device 100 without user intervention.

Figure 9:
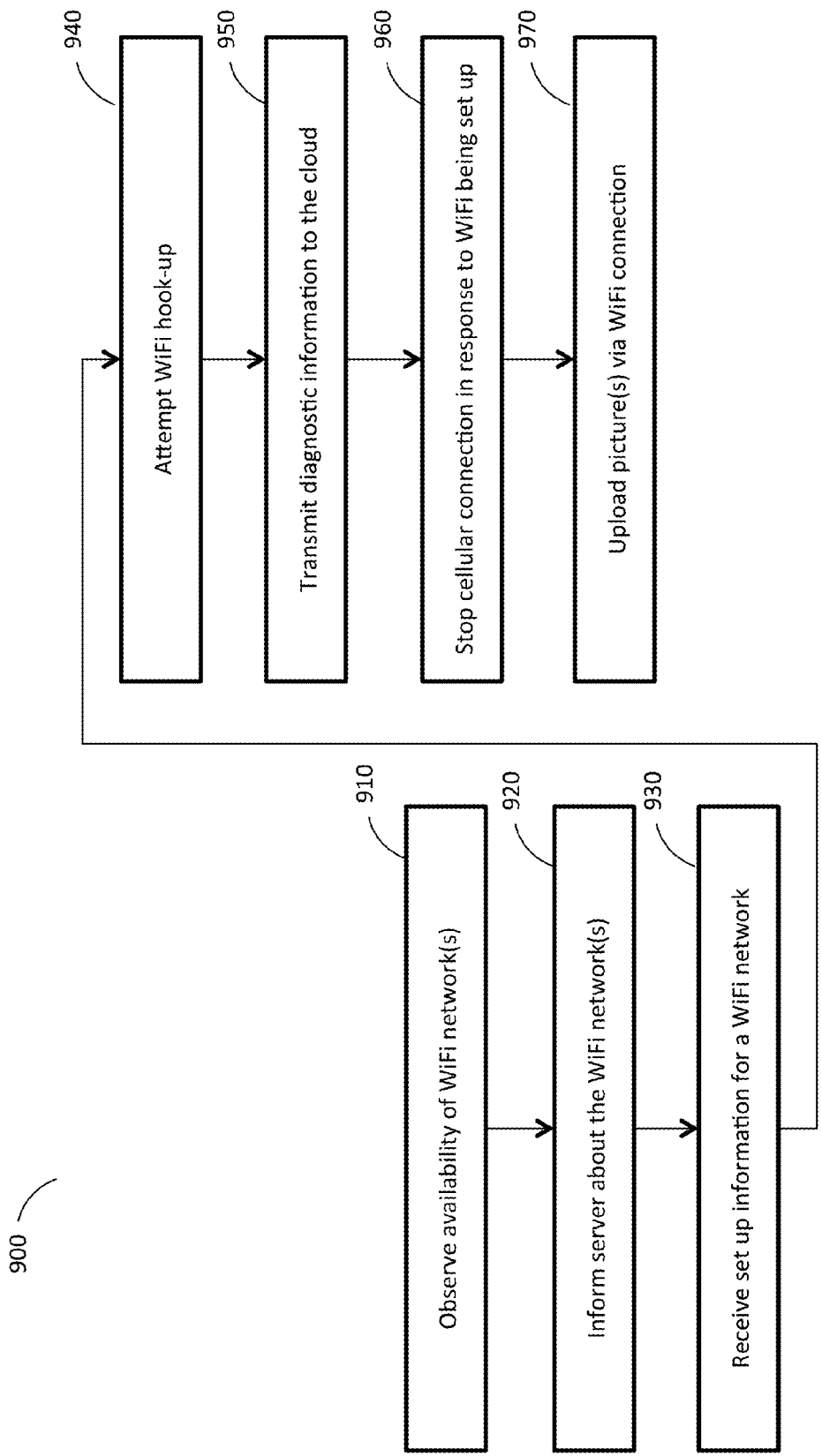
FIG. 9 is a flow chart illustrating a method for WiFi hookup at a device for visual monitoring according to an embodiment.

In some embodiments, VM device 100 is also loaded with a WiFi hookup assistance program to allow a remote user to connect the VM device to a nearby WiFi hotspot via the packet-based network. FIG. 9 is a flowchart illustrating a process performed by the VM device when the WiFi hookup assistance program is being executed by the apps processor. As shown in FIG. 9, the VM device 100 would observe (910) availability of WiFi networks, inform (920) a server it is communicating with about the availability of the WiFi networks, and receive set up information for a WiFi network. The VM device 100 would then attempt WiFi hook-up (940) using the set-up information it received, and transmit (950) any diagnostic information to the cloud 500 to inform the server whether the hook-up has been successful. Upon successful hook-up to the WiFi network, the VM device 100 would stop (960) using the cellular connection and start using the WiFi connection to upload (970) pictures or data associated with the pictures it takes.

Figure 10:
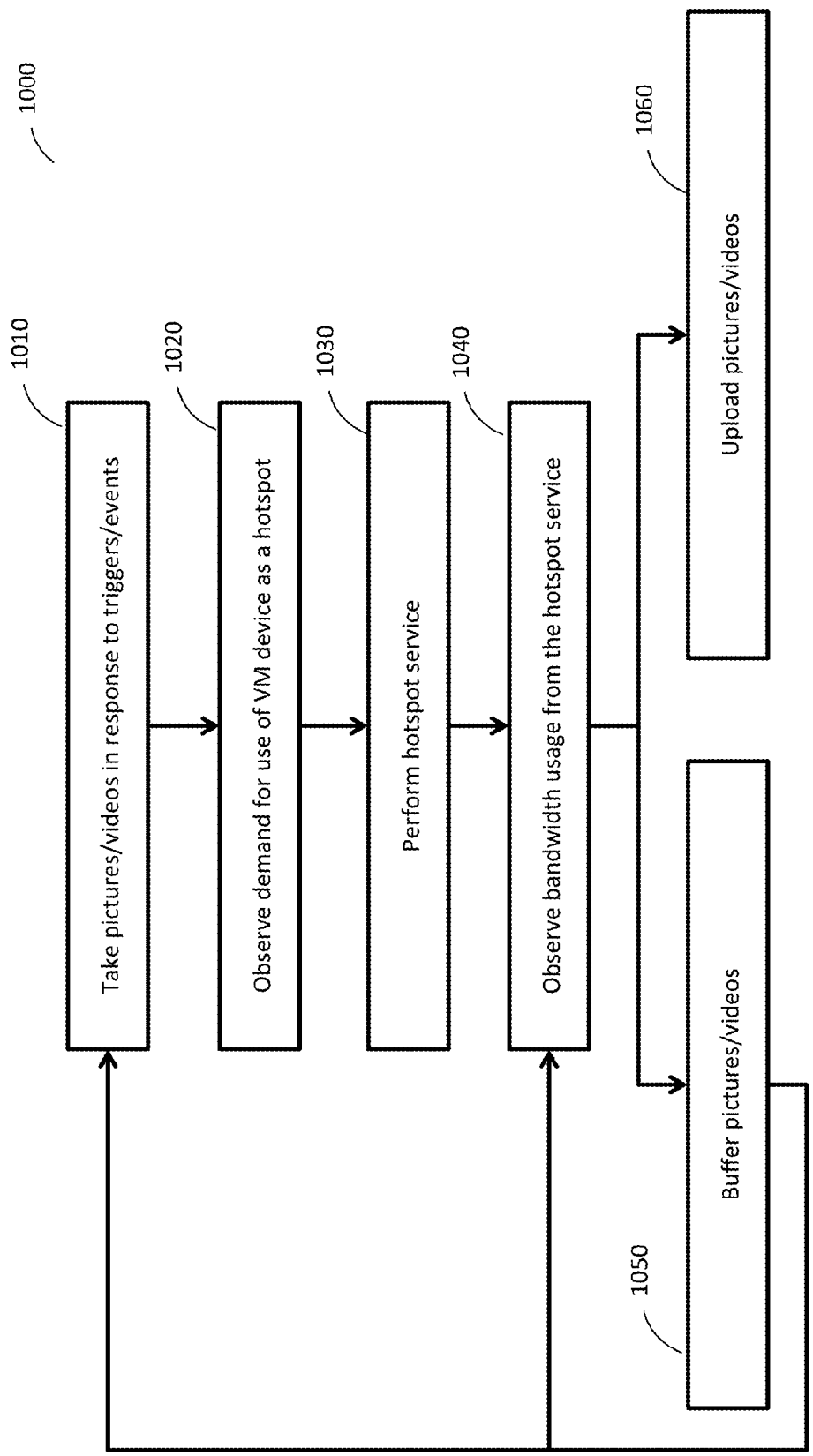
FIG. 10 is a flow chart illustrating a method for providing hotspot service at a device for visual monitoring according to an embodiment.

In some embodiments, VM device 100 is also loaded with a hotspot service program to allow the VM device be used as a WiFi hotspot so that nearby computers can use the VM device as a hotspot to connect to the packet-based network. FIG. 10 is a flowchart illustrating a process performed by the VM device when the hotspot service program is being executed by the apps processor. As shown in FIG. 10, while the VM device 100 is taking (1010) pictures/videos in response to triggers/events, it would observe (1020) any demand for use of the VM device 100 as a WiFi hotspot and perform (1030) hotspot service. While it is performing the hotspot service, the VM device 100 would observe (1040) bandwidth usage from the hotspot service, and either buffer (1050) the pictures/videos when the hotspot usage is high, or upload (1060) the pictures/videos to the cloud 500 for further processing or sharing with a group of users of a social network when the hotspot usage is low.

Figure 11:
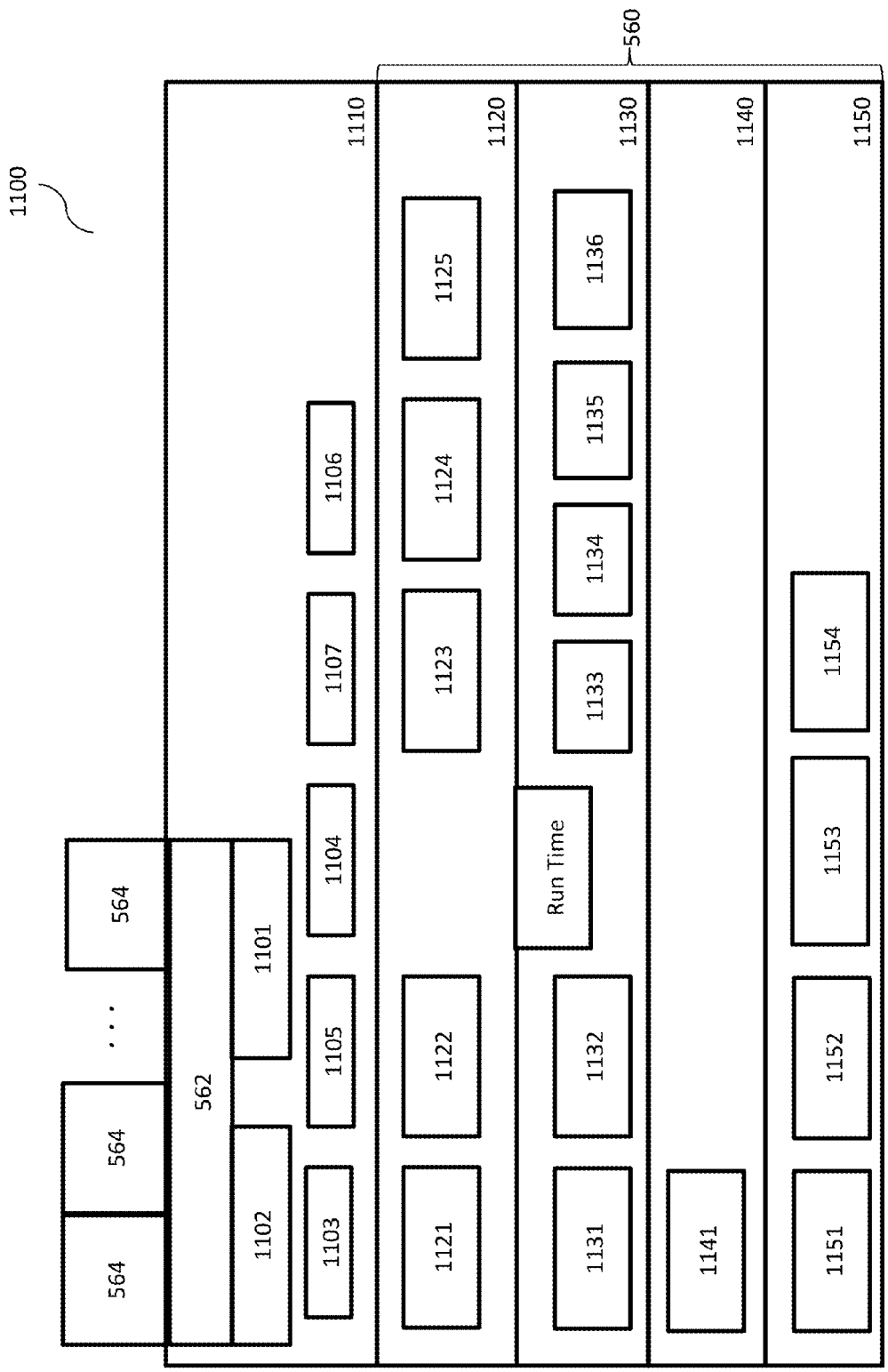
FIG. 11 is a block diagram of a software stack at a device for visual monitoring according to an embodiment.

FIG. 11 is a block diagram illustrating a software stack 1100 associated with the VM device 100. As shown in FIG. 11, the Camera App 562 according to one embodiment can be implemented as part of an applications layer 1110 over a mobile operating system 560 (e.g., the Android Operating System having an application framework layer 1120 over a libraries layer 1130), which is built over a base operating system (e.g., Linux having a services layer 1140 over a kernel layer 1150). The applications layer 1102 may include other applications such as an administrator application 1101 for administrating the Camera App and a watchdog application 1102 for monitoring the Camera app. The applications layer may also include applications such as Java mail 1103, which is used by the Camera App to send/receive email messages, FFMEG 1104, which can be used by the Camera App to optionally transcode, for example individual JPG image files, into, for example, an inter-frame H.264 video file that has 10× high compression, and/or OpenCV 1105, which is used by the Camera App to perform image processing and other computer vision tasks like finding and calculating visual descriptors. The applications layer may include well-known applications such as Contacts 1106 for recording contacts information, instant messaging, and/or short messaging service (SMS) 1107, which the Camera App utilizes to perform the functions of the VM devices discussed herein.

The Linux kernel layer 1150 includes a camera driver 1151, a display driver 1152, a power management driver 1153, a WiFi driver 1154, and so on. The service layer 1140 includes service functions such as an init function 1141, which is used to boot up operating systems and programs. In one embodiment, the init function 1141 is configured to boot up the operating systems and the Camera App in response to the VM device 100 being connected to external power instead of pausing at battery charging. It is also configured to set up permissions of file directories in one or more of the memories in the VM device 100.

In one embodiment, the camera driver 1151 is configured to control exposure of the camera(s) to: (1) build multi-frame HDR pictures, (2) focus to build focal stacks or sweep, (3) perform scalado functionalities (e.g., speedtags), and/or (4) allow the FPGA to control multiple cameras and perform hardware acceleration of triggers and visual descriptor calculations. In one embodiment, the display driver 1152 is configured to control backlight to save power when the display/input module 130 is not used. In one embodiment, the power management driver is modified to control charging of the battery to work with solar charging system provided by one or more solar stalks.

In one embodiment, the WiFi driver 1154 is configured to control the setup of WiFi via the packet-based network so that WiFi connection of the VM device can be set up using its cellular connections, as discussed above with reference to FIG. 9, eliminating the need for a display module on the VM device.

Still referring to FIG. 11, the mobile operating system includes a libraries layer 1130 and an application framework layer 1120. The libraries layer includes a plurality of runtime libraries such as OpenGL|ES 1131, Media Framework 1132, SSL 1133, libc 1134, SQLite 1135, Surface Manager 1136, etc. The OpenGL|ES 1131 is used by the Camera App 562 to accelerate via GPU offload calculations like motion detection calculations, visual descriptor calculations (such as those for finding interested feature points in captured images or videos), calculations related to image processing algorithms such as HDR fusion and low light boosting, etc. The media framework 1132 is used by the Camera App 562 to compress pictures and videos for storage or uploading. The SSL 1133 is used by the Camera App 562 to authenticate via certain protocols (e.g., OAuth) to authenticate access to the social network and/or on-line storage accounts (such as Google+ or Picassa) and to set up HTTP transport. The SQLite 1135 is used by users or administrators of the VM device to remotely control the operation of the Camera App 562 and/or the VM device 100 by setting up and/or updating certain on-line information associated with an on-line user account (e.g., gmail contacts). Such on-line information can be synced with the contacts information on the VM device which is used by the Camera App to set up parameters that determine how the Camera App runs and what functions it performs. This manner of controlling the VM device allows the user to bypass the firewalls of the mobile operating system. Other such ways of controlling the VM device through the firewall include, emails, chat programs, Google's Cloud to Device Messaging, and SMS messages. The Surface Manager is used by the Camera App to capture preview pictures from the camera(s), which can be used for motion detection and/or other visual descriptor calculation at a much higher frame rate than using pictures or videos to do the calculation.

Still referring to FIG. 11, the application framework layer 1120 includes an activity manager 1121, content providers 1122, a view system 1123, a location manager 1124 and a package manager 1125. The location manager 1124 can be used to track the VM device if it is stolen or lost or simply to add geolocation information to pictures/video. The package manager 1125 can be used to control updates and start/stop times for the Camera App.

Still referring to FIG. 11, in the applications layer, a watchdog program 1102 is provided to monitor the operation of the VM device 100. The watchdog 1102 may be configured to monitor the operating system and in response to the operating system being booted up, launch the Camera App. The watchdog program notes when: (1) the VM device 100 has just been connected to external power; (2) the VM device 100 has just been disconnected from external power; (3) the VM device 100 has just booted up; (4) the Camera App is forced stopped; (5) the Camera App is updated; (6) the Camera App is force updated; (7) the Camera App has just started, and/or (8) other events occurs at the VM device 100. The watchdog may send notices to designated user(s) in the form of, for example, email messages, when any or each of these events occurs.

Also in the applications layer, an administrator program 1101 is provided to allow performance administrative functions such as shutting down the VM device 100, rebooting the VM device 100, stopping the Camera App, restarting the Camera App, etc. remotely via the packet-based network. In one embodiment, to bypass the firewalls, such administrative functions are performed by using the SMS application program or any of the other messaging programs provided in the applications layer or other layers of the software stack.

Still referring to FIG. 11, the software stack may further include various trigger generating and/or visual descriptor programs 564 built upon the Camera App 560. A trigger generating program is configured to generate triggers in response to certain predefine criteria being met and prescribe actions to be taken by the Camera App in response to the triggers. A visual descriptor program is configured to analyze acquired images (e.g., preview images) to detect certain prescribed events and notifies the Camera App when such events occurs and/or prescribe actions to be taken by the Camera App in response to the events. The software stack may also include other application programs 564 built upon the Camera App 560, such as the moving object counting program discussed below.

The Camera App 560 may include a plurality of modules, such as an interface module, a settings module, a camera service module, a transcode service module, a pre-upload data processing module, an upload service module, an (optional) action service module, an (optional) motion detection module, an optional trigger/action module and an (optional) visual descriptor module.

Upon being launched by, for example, the watchdog program 1102 upon boot-up of the mobile operating system 560, the interface module performs initialization operations including setting up parameters for the Camera App based on settings managed by the settings module. As discussed above, the settings may be stored in the Contacts program and can be set-up/updated remotely via the packet-based network. Once the initialization operations are completed, camera service module starts to take pictures in response to certain predefined triggers, which can be, triggers generated by the trigger/action module in response to events generated from the visual descriptor module or certain predefined triggers, such as, for example, the beginning or ending of a series of time intervals according an internal timer. The motion sensor module may start to detect motions using the preview pictures. Upon detection of certain motions, the interface module would prompt the camera service module to record videos or take high-definition pictures or sets of pictures for resolution enhancement or HDR calculation, or the action service module to take certain prescribed actions. It may also prompt the upload module to upload pictures of videos associated with the motion event.

Without any motion or other visual descriptor events, the interface module may decide whether certain criteria are met for pictures or videos to be uploaded (as described above) and may prompt the upload service module to upload the pictures or videos, or the transcode service module to transcode a series of images into one or more videos and upload the videos. Before uploading, the pre-upload data processing module may process the image data to extract selected data of interest, group the data of interest into a combined image, such as the tripline images discussed below with respect to an object counting method. The pre-upload data processing module may also compress and/or transcode the images before uploading.

The interface module is also configured to respond to one or more trigger generating programs and/or visual descriptor programs built upon the Camera App, and prompt other modules to act accordingly, as discussed above. The selection of which trigger or events to respond to can be prescribed using the settings of the parameters associated with the Camera App, as discussed above.

As one application of the VM device, the VM device can be used to visually datalog information from gauges or meters remotely. The camera can take periodic pictures of the gauge or gauges, convert the gauge picture using computer vision into digital information, and then send the information to a desired recipient (e.g. a designated server).

The server can then use the information per the designated action scripts (e.g. send an email out when gauge reads empty).

As another application of the VM device 100, the VM device 100 can be used to visually monitor a construction project or any visually recognizable development that takes a relatively long time to complete. The camera can take periodic pictures of the developed object, and send images of the object to a desired recipient (e.g. a designated server). The server can then compile the pictures into a time-lapsed video, allowing interested parties to view the development of the project quickly and/or remotely.

As another application of the VM device 100, the VM device 100 can be used in connection with a tripline method to count moving objects. In one embodiment, as shown in FIG. 1E and FIG. 5, the VM device 100 comprises a modified android smartphone 180 with a camera 110 on a tether, and a server 550 in the cloud 500 is connected to the smartphone 180 via the Internet 530. The camera can be mounted on the inside window of a storefront with the smartphone mounted on the wall by the window. This makes for a very small footprint since only the camera is visible through the window from outside the storefront.

Figure 12A:
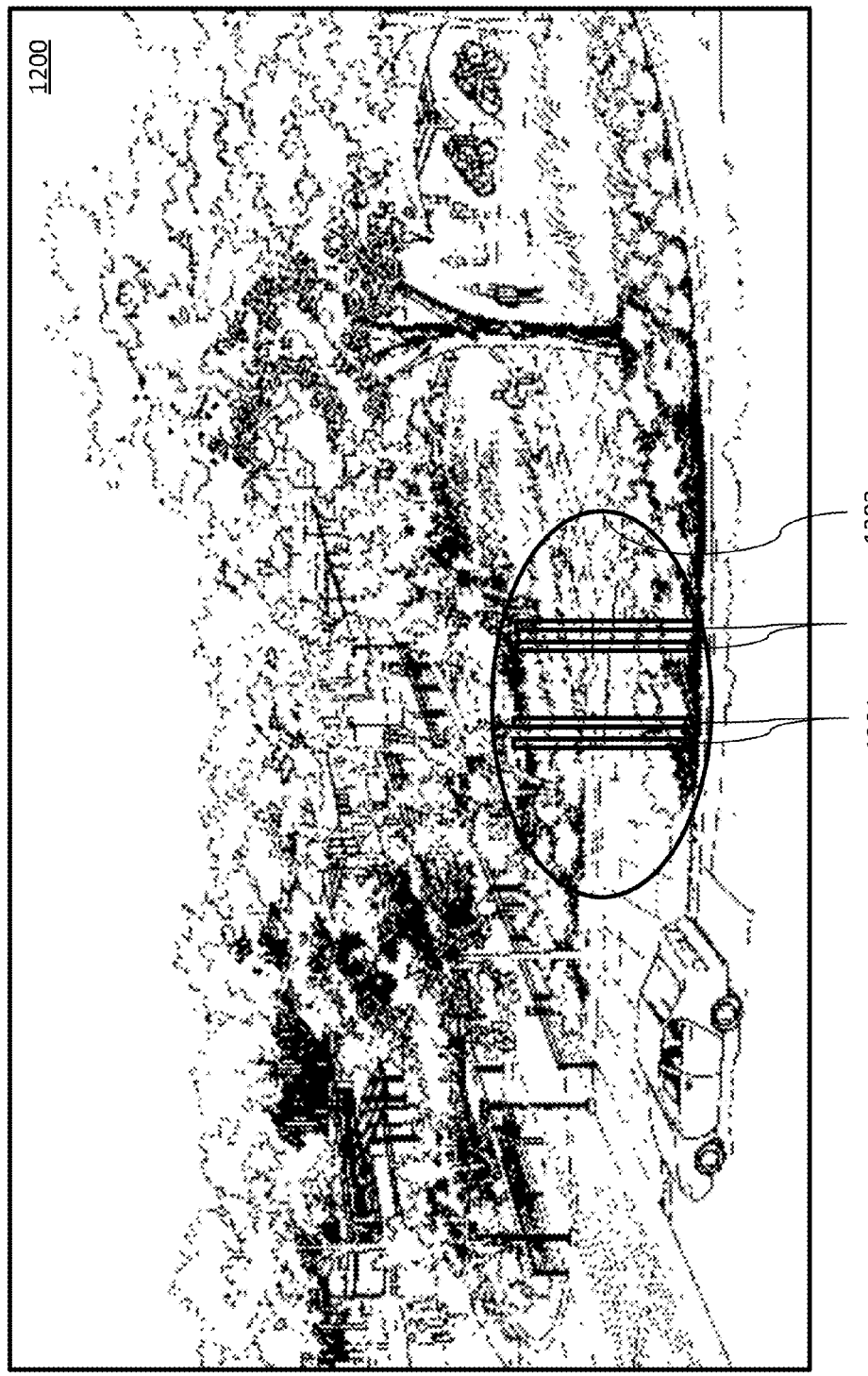
FIG. 12A is a schematic diagram of field of view of a device for visual monitoring and triplines defined in the field of view according to an embodiment.
Figure 12B:
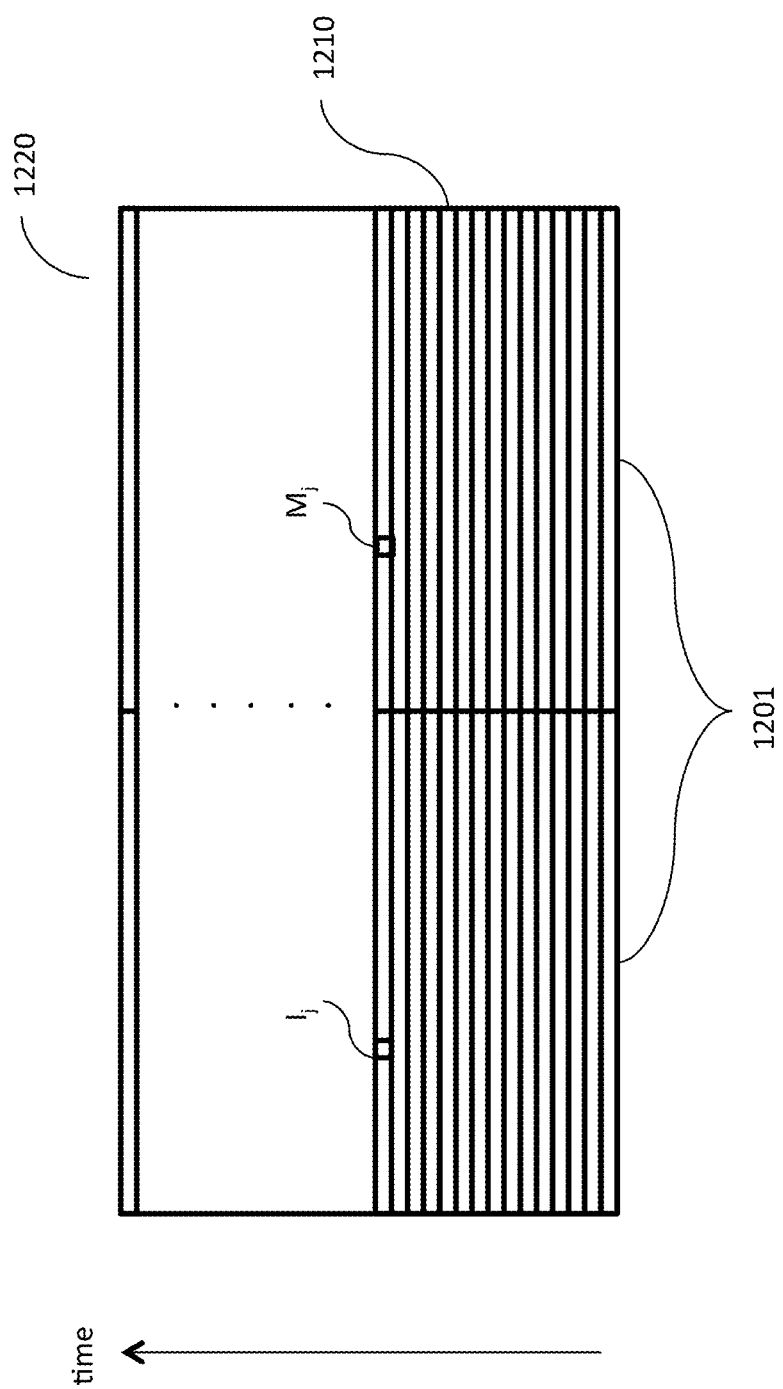
FIG. 12B is a schematic diagram of a tripline image according to an embodiment.
Figure 12C:
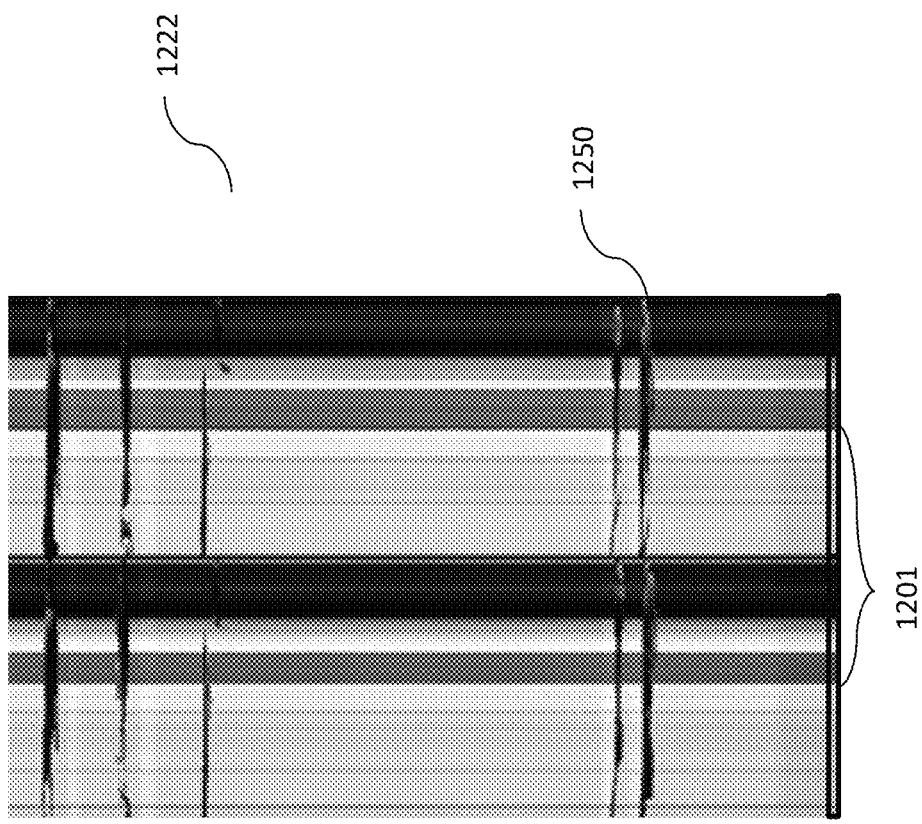
FIG. 12C is an exemplary tripline image.

As shown in FIG. 12A, in a camera's view 1200, one or more line segments 1201 for each region of interest 1202 can be defined. Each of these line segment 1201 is called a Tripline. Triplines can be set up in pairs. For example, FIG. 12A shows two pairs of triplines. On each frame callback, as shown in FIG. 12B, the VM device 100 stacks all the pixels that lie on each of a set of one or more Triplines, and joins all these pixel line segments into a single pixel row/line 1210. For example, in FIG. 12B, pixels from a pair of triplines at each frame call back are placed in a horizontal line. Once the VM device 100 has accumulated a set number of lines 1210 (usually 1024 lines), these lines now form a 2 dimensional array 1220 of YUV pixel values. This 2 dimensional array is equivalent to an image (Tripline image) 1220. This image 1220 can be saved to the SD card of the smartphone and then compressed and sent to the server by the upload module of the Camera App 560. The outcome image has the size of W×1024, where W is the total number of pixels of all [1] the triplines in the image. The height of the image can represent time (1024 lines is ~1 minute) ?A sample tripline 1222 image is shown in FIG. 12C. The image 1222 comprised pixels of two triplines of a side walk region in a store front, showing 5 pedestrians crossing the triplines at different times. ?Each region usually has at least 2 triplines to calculate direction and speed of detected objects. This is done by measuring how long it takes for the pedestrian to walk from one tripline to a next one. The distance between triplines can be measured beforehand.

The server 550 processes each tripline image independently. It detects foregrounds and return the starting position and the width of each foreground region. Because the VM device 100 automatically adjusts its contrast and focus, intermittent lighting changes occur in the tripline image. To deal with this problem in foreground detection, an MTM (Matching by Tone Mapping) algorithm is used as at first to detect the foreground region. In one embodiment, the MTM algorithm comprises following steps:

Breaking tripline segment;
K-Means background search;
MTM background subtraction;
Thresholding and event detection; and
Classifying pedestrian group.

Because each tripline images may include images associated with multiple triplines, the tripline image 12220 is divided into corresponding triplines 1210 and MTM background subtraction is performed independently.

In the K-Means background search, because a majority of the triplines are background, and because background triplines are very similar to each other, k-means clustering is used to find the background. In one embodiment, grey-scale Euclidean distance as k-means distance function is used:

$$D=\Sigma\_(j=0)^{}N?(I?\_j-M\_j)^{}2,$$

where I and M are two triplines with N pixels. Ij and Mj are pixels at j position, as shown in FIG. 12B.

K-means++ algorithm can be used to initialize k-means iteration. For example, K is chosen to be 5. In one embodiment, a tripline is first chosen from random as the first cluster centroid. Distances between other triplines and the chosen tripline are then calculated. The distances are used as weights to choose the rest of cluster centroids. The bigger the weight, the more likely it is to be chosen.

After initialization, k-means is run for a number of iterations, which should not exceed 50 iterations. A criteria, such as that cluster assignment does not change for more than 3 iterations, can be set to end the iteration.

In one embodiment, each cluster is assigned a score. The score is a sum of inverse distance of all the triplines in the cluster. The cluster with the largest score is assumed to be the background cluster. In other words, the largest and tightest cluster is considered to be the background. Distances between other cluster centroids to the background cluster centroid are then calculated. If any of distances is smaller than 2 standard deviation of the background cluster, it is merged into the background. K-means is performed again with merged clusters.

MTM is a pattern matching algorithm proposed by Yacov Hel-Or et. al. It takes two pixel vectors and returns a distance that ranges from 0 to 1, where 0 means the two pixel vectors are not similar and 1 means the two pixel vectors are very similar. For each tripline, the closest background tripline (in time) from background cluster is found and a M™ distance between the two is afterward determined. In one embodiment, an adaptive threshold MTM distance is used. For example, if an image is dark, meaning the signal to noise ratio is high, then the threshold is high. If an image is indoor and has good lighting condition, then the threshold is low. The MTM distance between neighboring background cluster triplines can be calculated, i.e. the MTM distance between two triplines that are in background cluster obtained from k-means and are closest to each other in time. The maximum of intra-background MTM distance is used as threshold. The threshold can be clipped, for example, between 0.2 and 0.85.

If MTM distance of a tripline is higher than the threshold, it is considered to belong to an object, and it is labeled with an value, e.g., "1", to indicate that. A closing operator is then applied to close any holes. A group of connected 1's is called an event of the corresponding tripline.

In one embodiment, the triplines come in pairs, as shown in FIGS. 12a-12C. The pair of triplines are placed close enough so that if an object crosses one tripline, it should cross the other tripline as well. Pairing is a good way to eliminate false positives. Once all the events in the triplines are found, they are paired up, and orphans are discarded. In a simple pairing scheme, if one object cannot find a corresponding or overlapping object on the other tripline, it is an orphan.

The above described tripline method for object counting can be used to count vehicles as well as pedestrians. When counting cars, the triplines are defined in a street. Since cars move much faster, the regions corresponding to cars in the tripline images are smaller. In one embodiment, at 15-18 fps, the tripline method can achieve a pedestrian count accuracy of 85% outdoor and 90% indoor, a car count accuracy of 85%.

In one embodiment, the trip-line method can also be used to measure a dwell time, i.e. the duration of time in which a person dwells in front of a storefront. Several successive triplines can be set up the images of a store front and the pedestrian velocity as they walk in front of the store front can be measured. The velocity measurements can then be used to get the dwell time of each pedestrian. The dwell time can be used as a measure of the engagement of a window display.

Alternatively, or additionally, the android smartphone can be used to sniff local WiFi traffic and associated MAC addresses of local WiFi devices. In one embodiment, the android smartphone 180 can be used to sniff local wifi traffic and/or associated MAC addresses of local wifi devices. These MAC addresses are associated with people who are near the android phone 180, so the MAC addresses can be used for people counting because the number of unique MAC addresses at a given time can be an estimate of the number of people around with smartphones.

Since MAC addresses are unique to a device and thus unique to a person carrying the device, the MAC addresses can also be used to track return visitors. To preserve the privacy of smartphone carriers, the MAC addresses are never stored on any server. What can be stored instead is a one-way hash of the MAC address. From the hashed address, one cannot recover the original MAC address. When a MAC address is observed again, it can be matched with a previously recorded hash.

Wifi sniffing allows uniquely identifying a visitor by his/her MAC address (or hash of the MAC address). The camera can also record a photo of the visitor. Then either by automatic or manual means, the photo can be labeled for gender, approximate age, and ethnicity. The MAC address can be tagged with the same labels. This labeling can be done just once for new MAC addresses so that this information can be gathered in a more scalable fashion since over a period of time, a large percentage of the MAC addresses will have demographics information attached. This allows using the MAC addresses to do counting and tracking by demographics. Another application is clienteling where the MAC address of a customer gets associated to the customers loyalty card. When the customer nears and enters a store, the store staff knows that the customer is in the store and can better service the customer appropriately by understanding their preferences, how important of a customer they are to that store, and whether they are a new vs. a repeat customer.

In addition to the WiFi counting and tracking as described above, and audio signals can also be incorporated. For example, if the microphone hears the cash register, the associated MAC address (visitor) can be labeled with a purchase event. If the microphone hears a door chime, the associated MAC address (visitor) can be labeled with entering the store.

For VM device 100 mounted inside a store display, the number of people entering the store can be counted by counting the number of times a door chime rings. The smartphone can use it's microphone to listen for the door chime, and report the door chime count to the server.

In one embodiment, a VM device mounted inside a store display can listen to the noise level inside the store to get an estimate of the count of people inside the store. The smartphone can average the noise level it senses inside the store every second. If the average noise level increases at a later time, then the count of the people inside the store most likely also increased, and vice versa.

For a sizable crowd such as a restaurant environment, the audio generated by the crowd is a very good indicator of how many people are present in the environment. If one to plot the recording from a VM device disposed in a restaurant and the recording starts at 9:51 am, and ended at 12:06 pm. The plot should show that the volume goes up as the store opens at 11 am, and continues to increase when the restaurant gets busier and busier towards lunchtime.

In one embodiment, background noise is filtered. Background noise can be any audio signal that is not generated by human, for example, background music in a restaurant is background noise. The audio signal is first transformed to the frequency domain, then a band limiting filter can be applied between 300 Hz and 3400 Hz. The filtered signal is then transformed back to time domain and the audio volume intensity is then calculated.

Other sensing modalities that can be sensed are barometer (air pressure), accelerometer, magnetometer, compass, GPS, gyroscope. These sensors along with the sensors mentioned above can be fused together to increase the overall accuracy of the system. Sensing data from multiple sensor platforms in different locations can also be merged together to increase the overall accuracy of the system. In addition, once the data is in the cloud, the sensing data can be merged together with other 3rd party data like weather, Point-of-sales, reservations, events, transit schedules, etc. to generate prediction of the data and analytics. For example, pedestrian traffic is closely related to the weather. By using statistic analysis, the amount of pedestrian traffic can be predicted for a given location.

A more sophisticated prediction is for site selection for retailers. The basic process is to benchmark existing stores to understand what the traffic patterns look like outside an existing store. Then correlate the Point of sales for that store with the outside traffic. From this a traffic based revenue model can be generated. Using this model, prospective sites are measured for traffic and the likely revenue for a prospective site can be estimated. Sensor platforms deployed for prospective stores often do not have access to power or WiFi. In these cases, the android phones will be placed in exterior units so that they can be strapped to poles/trees or attached to the side of buildings temporarily. An extra battery will be attached to the phone instead of the enclosure so that the sensor platform can run entirely on battery. In addition, compressive sensing techniques will be used to also extend battery life. The cellular radio will be used in a non-continuous manner to also extend battery life of the platform.

Another use case is to measure the conversion rate of pedestrians walk by a store front vs. entering a store. This can be done by having either two sensor platforms, one watching the street and another watching the door. Alternatively, a two-eye stalk sensor platform can be used to have one eye stalk camera watching the street and another watching the door. The two camera solution is preferred since the radio and computation can be shared among the two cameras. By recording when the external storefront changes (e.g. new posters in the windows, new banners), a comprehensive database of conversion rates can be compiled that allows predictions as to which type of marketing tool to use to improve conversion rates.

Another use case is to use the cameras on the sensor platform in an area where there are many sensor platforms are deployed. Instead of having out-of-date Google Streetview photos taken every 6-24 months, realtime streetview photos can be merged on existing Google Streetview photos to provide a more up-to-date visual representation of how a certain street appears at that moment.

There are many different applications of the VM device 100 and the methods associated therewith, and many other applications can be developed using the VM device 100 and the software provided therein and in the cloud.

The foregoing description and drawings represent the preferred embodiments of the present invention, and are not to be used to limit the present invention. For those skilled in the art, the present invention may be modified and changed. Without departing from the spirit and principle of the present invention, any changes, replacement of similar parts, and improvements, etc., should all be included in the scope of protection of the present invention.

What is claimed is:

1. A device, comprising:
   a mobile chipset disposed in a housing wherein the mobile chipset includes an applications processor configured to extract object counts, object direction, and object dwell time from images;
   at least one eyestalk attached to the housing and communicatively coupled to the mobile chipset;
   mounting hardware affixed to the housing, the mounting hardware configured to physically mount to the base of an overhead light fixture and to electrically couple to the wiring of the base of the overhead light fixture; and
   at least one memory component storing therein a mobile operating system and a camera application program built on the mobile operating system, the camera application program including program instructions which, when executed by the applications processor, causes the device to:
   take images in response to automatically generated triggers;
   upload data from the images to a packet-based network;
   extract pixel data corresponding to one or more objects of interest from images taken at different points of time; and
   upload a pixel image including the extracted pixel data to a packet-based network;
   wherein the pixel data are tripline data associated with predefined triplines in a field of view of the at least one eyestalk and the pixel image is a two-dimensional array of the tripline data taken from pixels corresponding to the triplines in the images taken at different points of time.

2. The device of claim 1, wherein the at least one eyestalk protrudes from the housing, and wherein each eyestalk includes a flexible stem and a swivel head.

3. The device of claim 1, wherein the at least one eyestalk comprises a camera unit on a tether attached to the mobile chipset.

4. The device of claim 1, wherein the at least one eyestalk includes multiple camera units, the device further comprising
   an FPGA chip coupled between the camera units and the mobile chipset, the FPGA chip being configured to multiplex signals between the camera units and the mobile chipset.

5. The device of claim 1, wherein the mobile operating system is an Android operating system.

6. The device of claim 1, wherein the camera application program further includes program instructions which, when executed by the applications processor, causes the device to:
   detect occurrence of one or more prescribed events based on one or more visual descriptors in images acquired by the at least one eyestalk; and
   take pre-determined actions in response to the occurrence of one or more prescribed events.

7. The device of claim 1, wherein the camera application program further includes program instructions which, when executed by the applications processor, causes the device to:
   generate the predefined triggers based on predefined criteria.

8. The device of claim 1, wherein the camera application program further includes program instructions which, when executed by the applications processor, causes the device to:
   detect the occurrence of prescribed events based on visual descriptors in one or more of the images acquired by the eyestalks.

9. The device of claim 1, wherein the camera application program further includes program instructions which, when executed by the applications processor, causes the device to:
   extract a reading of a gauge or meter in a field of view of the at least one eyestalk; and
   upload the reading to a packet-based network.

10. The device of claim 1, wherein the device comprises a plurality of stalks that are interchangeable and comprise: light stalks for providing illumination, ear stalks for capturing audio data, visual stalks for capturing video and image data, and device stalks for sniffing mobile device fingerprints.

11. The device of claim 10, wherein the visual stalks comprise field of view (FOV), high dynamic range (HDR), super resolution, low light, and clock phase shifted high speed camera stalks.

12. The device of claim 1, wherein the applications processor further includes program instructions that train the device to determine objects of interest using a training set consisting of images previously determined to contain objects of similar size and shape to the objects of interest.

13. The device of claim 1, configured to automatically modify program instructions according to installation parameters.

14. The device of claim 13, wherein the installation parameters include a number of devices capturing and contributing pixel data, a mounting height of the device, a field of view of the device, an amount of object traffic, the device's ambient lighting, and the importance of each category of extracted pixel data to a device operator.

15. A device comprising:
   a mobile device comprising a mobile chipset;
   a housing with mounting hardware for disposing the mobile device on a stationary structure;
   a plurality of stalks attached to the housing and communicatively coupled to the mobile chipset, the stalks configured to capture at least one of image, video, and audio data and sniff signals sent over ultra high frequency electromagnetic radiation;
   an applications processor that receives and processes data from the plurality of stalks, the applications processor configured to provide for object counts and coupling device identifying information with the at least one of image, video, and audio data; and
   at least one memory component storing therein a mobile operating system and a camera application program built on the mobile operating system, the camera application program including program instructions which, when executed by the applications processor, causes the device to:

take images in response to automatically generated triggers;

upload data from the images to a packet-based network;

extract pixel data corresponding to one or more objects of interest from images taken at different points of time; and upload a pixel image including the extracted pixel data to a packet-based network;

wherein the pixel data are tripline data associated with predefined triplines in a field of view of the at least one eyestalk and the pixel image is a two-dimensional array of the tripline data taken from pixels corresponding to the triplines in the images taken at different points of time.

16. The device of claim 15, wherein the applications processor is configured to estimate object counts by using an ear stalk to determine the noise level within a designated area and counting a number of audio events such as door chimes.

17. The device of claim 15, wherein the device identifying information includes local Wifi traffic and mobile device media access code (MAC) addresses.

18. A device comprising:

a mobile chipset disposed in a housing, the housing configured to attach to a stationary structure;

a plurality of stalks for capturing device signals and information about a zone of interest, the plurality of stalks coupled to the housing, wherein the housing is configured to orient the stalks to obtain an overhead perspective of the zone of interest while attached to the stationary structure;

an applications processor configured to determine mobile device and object distances from the stalks and associate devices with objects according to their positions in the sensor's field of view; and at least one memory component storing therein a mobile operating system and a camera application program built on the mobile operating system, the camera application program including program instructions which, when executed by the applications processor, causes the device to:

take images in response to automatically generated triggers;

upload data from the images to a packet-based network;

extract pixel data corresponding to one or more objects of interest from images taken at different points of time; and upload a pixel image including the extracted pixel data to a packet-based network;

wherein the pixel data are tripline data associated with predefined triplines in a field of view of the at least one eyestalk and the pixel image is a two-dimensional array of the tripline data taken from pixels corresponding to the triplines in the images taken at different points of time.

19. The device of claim 18, wherein the applications processor incorporates purchasing behavior into object profiles by tagging MAC addresses associated with an object profile with a purchasing event after the occurrence of an audio trigger.

20. The device of claim 19, wherein the audio trigger includes cash register sounds or audio emissions from other payment transaction electronics.

* * * * *